US007644409B2

(12) United States Patent
Dice et al.

(10) Patent No.: US 7,644,409 B2
(45) Date of Patent: Jan. 5, 2010

(54) TECHNIQUES FOR ACCESSING A SHARED RESOURCE USING AN IMPROVED SYNCHRONIZATION MECHANISM

(75) Inventors: David Dice, Foxborough, MA (US); Hui Huang, Sunnyvale, CA (US); Mingyao Yang, Santa Clara, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 982 days.

(21) Appl. No.: 10/861,795

(22) Filed: Jun. 4, 2004

(65) Prior Publication Data

US 2006/0031844 A1    Feb. 9, 2006

(51) Int. Cl.
G06F 9/46 (2006.01)
G06F 12/00 (2006.01)
G06F 9/44 (2006.01)
G06F 9/45 (2006.01)

(52) U.S. Cl. .................. 718/104; 718/100; 718/101; 718/108; 711/100; 711/130; 711/147; 711/155; 711/163; 711/154; 719/312; 717/106; 717/159

(58) Field of Classification Search ............ 718/1–108; 717/140–151, 106, 159–161; 711/100, 130, 711/147, 152–155, 163, 165–173; 719/312
See application file for complete search history.

(56) References Cited

U.S. PATENT DOCUMENTS 3,984,820 A   10/1976  Stanley et al. ............ 340/172.5
4,908,750 A   3/1990   Jablow ...................... 364/200
5,197,130 A   3/1993   Chen et al. .................... 712/3
5,228,131 A   7/1993   Ueda et al. .................. 395/375
5,438,677 A   8/1995   Adams et al. ............... 395/736
5,504,817 A   4/1996   Shamir ........................ 380/30
5,555,370 A   9/1996   Li et al. ....................... 395/161

(Continued)

FOREIGN PATENT DOCUMENTS

JP     2000-259436      9/2000

(Continued)

OTHER PUBLICATIONS

Card, Stuart K., et al. "The WebBook and the Forager: an informational workspace for the World-Wide Web", ACM Conference, 1996, pp. 111-117.

(Continued)

*Primary Examiner*—Meng-Ai An
*Assistant Examiner*—Abdullah Al Kawsar
(74) *Attorney, Agent, or Firm*—Brooks Kushman P.C.

(57) ABSTRACT

A technique for accessing a shared resource of a computerized system involves running a first portion of a first thread within the computerized system, the first portion (i) requesting a lock on the shared resource and (ii) directing the computerized system to make operations of a second thread visible in a correct order. The technique further involves making operations of the second thread visible in the correct order in response to the first portion of the first thread running within the computerized system, and running a second portion of the first thread within the computerized system to determine whether the first thread has obtained the lock on the shared resource. Such a technique alleviates the need for using a MEMBAR instruction in the second thread.

15 Claims, 5 Drawing Sheets

U.S. PATENT DOCUMENTS

| | | | | |
|---|---|---|---|---|
| 5,611,063 | A | 3/1997 | Loper et al. | 395/381 |
| 5,615,350 | A | 3/1997 | Hesson et al. | 395/394 |
| 5,671,381 | A | 9/1997 | Strasnick et al. | 395/355 |
| 5,765,206 | A | 6/1998 | Hohensee et al. | 711/203 |
| 5,796,830 | A | 8/1998 | Johnson et al. | 380/286 |
| 5,799,086 | A | 8/1998 | Sudia | 705/76 |
| 5,838,792 | A | 11/1998 | Ganesan | 380/282 |
| 5,872,981 | A * | 2/1999 | Waddington et al. | 710/200 |
| 5,892,828 | A | 4/1999 | Perlman | 713/183 |
| 5,898,850 | A | 4/1999 | Dickol et al. | 712/229 |
| 5,898,885 | A | 4/1999 | Dickol et al. | 712/36 |
| 5,905,895 | A | 5/1999 | Halter | 717/139 |
| 5,907,618 | A | 5/1999 | Gennaro et al. | 380/286 |
| 5,907,707 | A | 5/1999 | Ramalingam et al. | 717/104 |
| 5,913,065 | A | 6/1999 | Faustini | 717/107 |
| 5,937,066 | A | 8/1999 | Gennaro et al. | 380/286 |
| 5,943,496 | A | 8/1999 | Li et al. | 719/328 |
| 5,974,256 | A | 10/1999 | Matthews et al. | 717/141 |
| RE36,462 | E | 12/1999 | Chang et al. | 711/209 |
| 6,006,227 | A | 12/1999 | Freeman et al. | 707/7 |
| 6,011,918 | A | 1/2000 | Cohen et al. | 717/106 |
| 6,012,072 | A | 1/2000 | Lucas et al. | 715/526 |
| 6,052,699 | A | 4/2000 | Huelsbergen et al. | 707/206 |
| 6,070,010 | A | 5/2000 | Keenleyside et al. | 717/154 |
| 6,074,432 | A | 6/2000 | Guccione | 717/108 |
| 6,075,942 | A | 6/2000 | Cartwright, Jr. | 717/138 |
| 6,081,665 | A | 6/2000 | Nilsen et al. | 717/116 |
| 6,086,623 | A | 7/2000 | Broome et al. | 703/26 |
| 6,106,571 | A | 8/2000 | Maxwell | 717/131 |
| 6,131,187 | A | 10/2000 | Chow et al. | 717/106 |
| 6,141,794 | A | 10/2000 | Dice et al. | 717/118 |
| 6,151,703 | A | 11/2000 | Crelier | 717/136 |
| 6,158,048 | A | 12/2000 | Lueh et al. | 717/118 |
| 6,182,274 | B1 | 1/2001 | Lau | 717/104 |
| 6,185,686 | B1 * | 2/2001 | Glover | 713/190 |
| 6,253,215 | B1 | 6/2001 | Agesen et al. | 707/206 |
| 6,253,218 | B1 | 6/2001 | Aoki et al. | 715/526 |
| 6,289,451 | B1 | 9/2001 | Dice | 713/168 |
| 6,304,949 | B1 | 10/2001 | Houlsdworth | 711/170 |
| 6,308,315 | B1 | 10/2001 | Dice et al. | 717/106 |
| 6,327,701 | B2 | 12/2001 | Ungar | 717/5 |
| 6,430,670 | B1 | 8/2002 | Bryg et al. | 711/216 |
| 6,438,673 | B1 | 8/2002 | Jourdan et al. | 711/213 |
| 6,467,007 | B1 | 10/2002 | Armstrong et al. | 710/260 |
| 6,530,017 | B1 | 3/2003 | Dice et al. | 712/242 |
| 6,542,919 | B1 * | 4/2003 | Wendorf et al. | 718/100 |
| 6,658,652 | B1 | 12/2003 | Alexander, III et al. | 717/128 |
| 6,677,962 | B1 | 1/2004 | Bailey | 345/744 |
| 6,697,834 | B1 | 2/2004 | Dice | 718/102 |
| 6,715,142 | B1 * | 3/2004 | Saito et al. | 717/159 |
| 6,725,340 | B1 * | 4/2004 | Guthrie et al. | 711/141 |
| 6,799,236 | B1 | 9/2004 | Dice et al. | 710/200 |
| 6,854,048 | B1 | 2/2005 | Dice | 712/216 |
| 6,862,674 | B2 | 3/2005 | Dice et al. | 711/170 |
| 6,877,088 | B2 | 4/2005 | Dice | 712/235 |
| 2001/0020956 | A1 | 9/2001 | Moir | 345/765 |
| 2001/0042189 | A1 | 11/2001 | Babaian et al. | 712/23 |
| 2002/0138706 | A1 * | 9/2002 | Hugly | 711/163 |
| 2004/0088573 | A1 * | 5/2004 | Jeyaram | 713/201 |
| 2005/0015756 | A1 * | 1/2005 | Brown et al. | 717/136 |

FOREIGN PATENT DOCUMENTS

WO    WO 03/027845 A3    4/2003

OTHER PUBLICATIONS

Bershad, Brian N., et al., "Fast Mutual Exclusion for Uniprocessors", ACM Sigplan Notices: vol. 27, Issue 9, (Sep. 1992), pp. 223-233.

Newhall, Tia, et al., "Performance Measurement of Dynamically Complied Java Executions", Java ACM, 1999, pp. 42-50.

Ishizaki, Kazuaki, et al., "Design, Implementation, and Evaluation of Optimizations in a Just-In-Time Compiler", Java ACM, 1999, pp. 119-128.

Chang, Chi-Chao, et al., "Interfacing Java to the Virtual Interface Architecture", Java ACM, 1999, pp. 51-57.

Slye, J.H., et al. "Support for software interrupts in log-based roll-back-recovery", IEEE, Oct. 1998, vol: 47, Issue: 10, (Abstract Only).

Barua, S., "Computer-based multimedia system on computer organization and design", IEEE, Oct. 1997, (Abstract Only).

Search Report from GB application No. GB0510965.7 filed on May 31, 2005, 1 page.

* cited by examiner

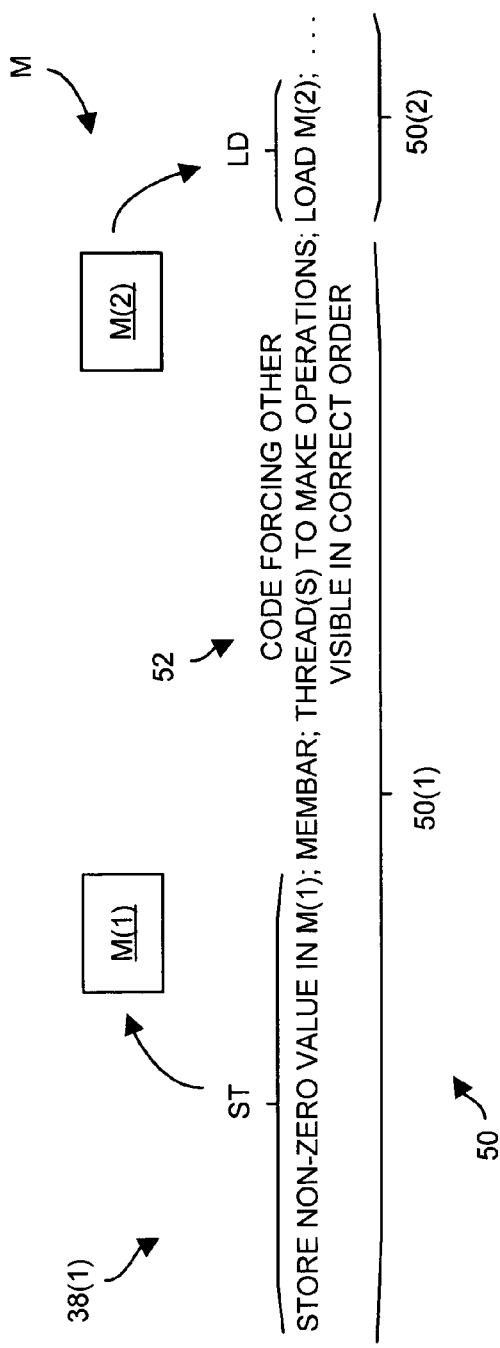
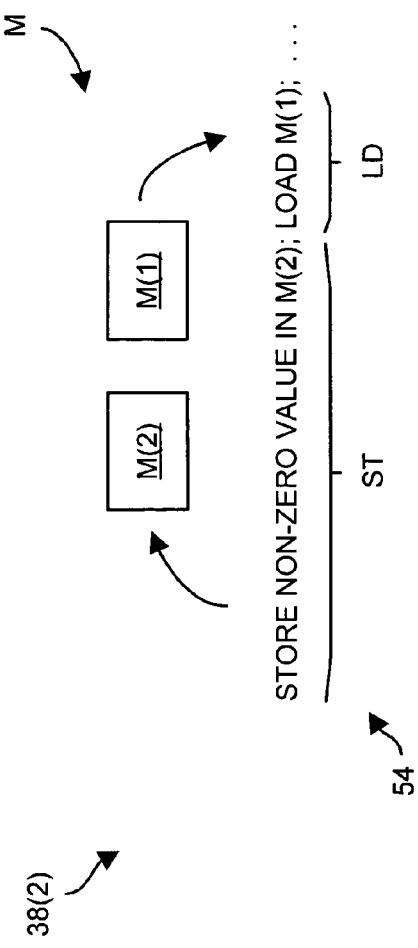
FIG. 2A
FIG. 2B

TECHNIQUES FOR ACCESSING A SHARED RESOURCE USING AN IMPROVED SYNCHRONIZATION MECHANISM

BACKGROUND

A typical computer system includes processing circuitry, memory and an input/output (I/O) interface that allows communications into and out of the system. The processing circuitry includes a set of processors (i.e., one or more processors) which is configured to run code stored in the memory (e.g., an operating system, command scripts, high level applications, other software constructs, etc.). The memory typically includes both random access memory (e.g., volatile semiconductor memory) as well as relatively slower non-volatile memory (e.g., disk drive memory). The I/O interface provides external access to the computer system (e.g., user access, communications with external devices, etc.).

Some computer systems enable multiple threads or processes (hereinafter generally referred to as threads) to share access to certain computer resources such as shared memory. These threads are configured to run simultaneously on the processing circuitry and share access to the shared memory (e.g., for inter-process communications). To prevent the threads from concurrently accessing the same shared memory data structure (e.g., a single location, a complex data structure such as a linked list involving many locations, etc.) at the same time and thus inadvertently corrupt data within that shared data structure, software developers typically employ one or more synchronization approaches which enable the simultaneously-running threads to coordinate their access of shared memory. Such approaches enable mutual exclusion where at most a single thread of the multiple threads running in parallel is permitted access to protected code or data at any time.

In one conventional synchronization approach (hereinafter referred to as the atomic instruction approach), the computer platform provides atomic operations or instructions. Examples include compare-and-swap (CAS), load-locked and store-conditional, exchange and fetch-and-add operations. The Intel® IA32 Architecture, which is offered by Intel Corporation of Santa Clara, Calif., provides CAS instructions under the name "cmpxchg".

In another conventional synchronization approach (hereinafter referred to as the simple load-store approach), the computer system provides a set of common memory locations, and each thread is configured to set and test the contents of these memory locations to determine whether that thread has access to a critical section. Classic examples of conventional load-store based synchronization mechanisms include Dekker, Dijkstra, Lamport and Peterson. For illustration purposes only, a short explanation of a simplified Dekker mechanism will now be provided.

Suppose that there are two threads running on a computer system. Both threads synchronize their execution in order to share access to a critical section of code using commonly accessible memory variables T1 and T2 which are initially zero. When the first thread is ready to access the critical section, the first thread stores a non-zero value into the memory variable T1, and loads the value of the memory variable T2. If the value of the memory variable T2 is non-zero, the first thread is blocked from accessing the critical section due to the second thread having a "lock" on the critical section. Accordingly, the first thread then clears the memory variable T1 and retries. However, if the value of the memory variable T2 is zero, the first thread obtains a lock on the critical section and then accesses the critical section.

Similarly, when the second thread is ready to access the critical section, the second thread stores a non-zero value into the memory variable T2, and loads the value of the memory variable T1. If the value of the memory variable T1 is non-zero, the second thread is blocked from accessing the critical section due to the first thread having a lock on the critical section. In response, the second thread clears the memory variable T2 and retries. However, if the value of the memory variable T1 is zero, the first thread obtains a lock on the critical section and then accesses the critical section.

It should be understood that the above-provided explanation is simplified for illustration purposes and is vulnerable to "livelock" where both the first thread and the second thread attempt to enter the critical section simultaneously and then perpetually spin, retrying. In practice, code developers augment the mutual exclusion mechanism with additional logic so that the two threads take turns to ensure progress and avoid livelock.

It should be further understood that certain processor architectures do not guarantee that, when multiple threads are running in parallel, each thread will be able to accurately view operations of the other threads in correct order. Rather, by not making such a guarantee, these processor architectures are able to enjoy certain optimizations (e.g., processor design optimizations, interconnect optimizations, etc.) which offer the potential to improve overall system performance. In particular, in the context of the above-described simplified Dekker mechanism, the store and load operations of each thread may be presented to the other thread out of order. Such reordering typically arises from out-of-order execution or by virtue of a processor's store buffer construct. For example, even though a thread may perform a store operation ahead of a load operation, the processor may place the store operation in a store buffer while making the load operation immediately visible to other threads on a communications bus thus showing the other threads the load operation before the store operation in an incorrect order. Unfortunately, if the system makes the store and load operations visible in the wrong order, the Dekker mechanism can fail and permit two threads to access the same critical section at one time. This is commonly termed an exclusion failure and is extremely undesirable as the data within the critical section can become inconsistent.

Examples of processor architectures which do not guarantee that threads will be able to accurately view operations of other threads in correct order are the SPARC® Architecture and the Intel® IA32 Architecture. The SPARC® Architecture is offered by SPARC® International, Inc. of San Jose, Calif.

To prevent exclusion failures, software developers utilize memory barrier (MEMBAR) instructions which provide certain guarantees regarding instruction order. In particular, a typical SPARC processor implements a MEMBAR instruction by delaying execution until the processor completely drains to memory and the stores become visible to other processors. The effect of executing a MEMBAR instruction is restricted to the executing processor. That is, executing a MEMBAR instruction does not cause actions on any remote processors. Additionally, for some processors, if the processor supports out-of-order or speculative execution, speculation typically is not allowed to proceed past the MEMBAR instruction.

With reference back to the earlier-provided simplified Dekker mechanism, software developers place MEMBAR instructions in the code of the first and second threads to avoid exclusion failures. In particular, the developers position MEMBAR instructions between the store and load instructions in each thread thus forcing the processors to make the executed store and load operations visible in the correct order for proper Dekker mechanism operation. That is, when the first thread is ready to access the critical section, the first thread stores a non-zero value into the memory variable T1, performs a MEMBAR operation and loads the value of the memory variable T2. The MEMBAR operation in the first thread ensures that the executed store operation is visible to the second thread prior to the executed load operation. Similarly, when the second thread is ready to access the critical section, the second thread stores a non-zero value into the memory variable T2, performs a MEMBAR operation and loads the value of the memory variable T1. Again, the MEMBAR operation in the second thread ensures that the executed store operation is visible to the first thread prior to the executed load operation, i.e., in the correct order).

SUMMARY

Unfortunately, there are deficiencies to the above-described conventional synchronization approaches. In particular, in connection with the above-described conventional atomic instruction approach, atomic instructions are relatively slow. For example, the conventional CAS instruction typically requires 50 to 200 cycles to complete.

Furthermore, in connection with the above-described conventional simple load-store approach which uses MEMBAR instructions to ensure proper operation of the Dekker mechanism, MEMBAR instructions are extremely expensive to perform. In particular, each MEMBAR instruction is capable of incurring a latency of more than 400 cycles thus imposing a severe burden on each thread executing a MEMBAR instruction.

In contrast to the above-described conventional synchronization approaches, embodiments of the invention are directed to techniques for accessing a shared resource of a computerized system (e.g., a critical section of memory) using code within a first thread (or process) that forces operations of a second thread (or process) to become visible in a correct order. Such use alleviates the need to include a MEMBAR instruction in the second thread to avoid an exclusion failure. Accordingly, if the second thread tends to access the shared resource on a frequent basis, significant cycles that would otherwise be used on the MEMBAR instruction are saved.

One embodiment of the invention is directed to a method for accessing a shared resource of a computerized system. The method includes running a first portion of a first thread within the computerized system, the first portion (i) requesting a lock on the shared resource (e.g., a store instruction) and (ii) directing the computerized system to make operations of a second thread visible in a correct order (e.g., a change virtual memory access protection system call). The method further includes making operations of the second thread visible in the correct order in response to the first portion of the first thread running within the computerized system, and running a second portion of the first thread within the computerized system to determine whether the first thread has obtained the lock on the shared resource (e.g., a load instruction). Such an embodiment alleviates the need for using a MEMBAR instruction in the second thread.

BRIEF DESCRIPTION OF THE DRAWINGS

The foregoing and other objects, features and advantages of the invention will be apparent from the following description of particular embodiments of the invention, as illustrated in the accompanying drawings in which like reference characters refer to the same parts throughout the different views.

The drawings are not necessarily to scale, emphasis instead being placed upon illustrating the principles of the invention.

FIG. 2A is an example of a thread which is well-suited for accessing a shared resource of the computerized system of FIG. 1.

FIG. 2B is an example of another thread which is well-suited for accessing the shared resource of the computerized system of FIG. 1 but on a more frequent basis.

DETAILED DESCRIPTION

Embodiments of the invention are directed to techniques for accessing a shared resource of a computerized system (e.g., shared memory) using code within a first thread that forces operations of a second thread to become visible in a correct order. The use of such code alleviates the need to put a MEMBAR instruction in the second thread as is commonly done in conventional synchronization approaches to avoid exclusion failures. As a result, if the second thread tends to access the shared resource on a frequent basis, significant cycles that would otherwise be used on the MEMBAR instruction are saved.

Figure 1:
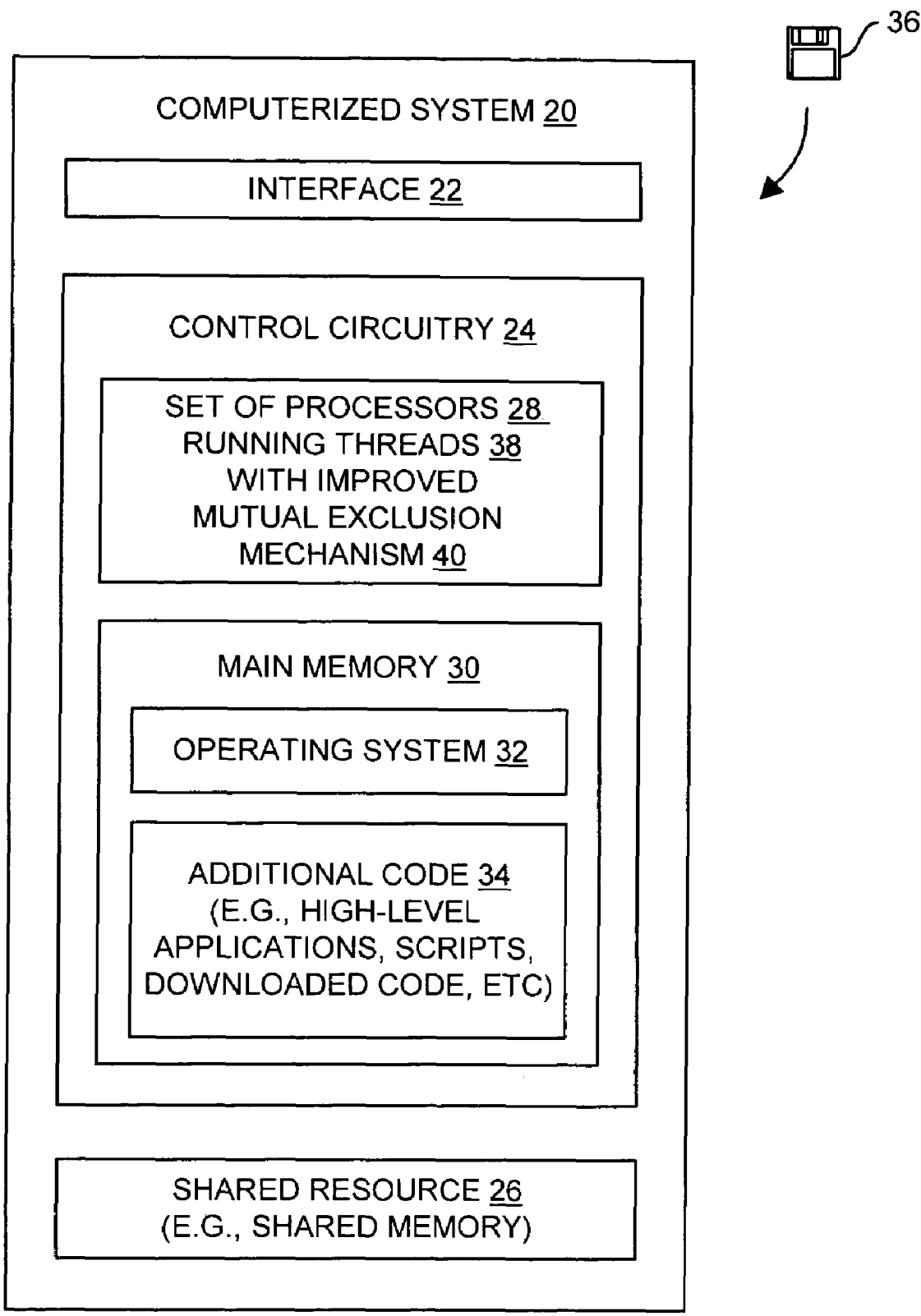
FIG. 1 is a block diagram of a computerized system which is suitable for use by the invention.

FIG. 1 shows a computerized system 20 which is suitable for use by the invention. The computerized system 20 includes an interface 22, control circuitry 24, and a shared resource 26. The interface 22 is configured to provide external access to the computerized system 20 (e.g., for a user, for communications with an external device, etc.). The shared resource 26 is a computerized resource of the system 20 which is sharable in a common manner among multiple computerized entities, e.g., threads, processes, processors, clients, etc. The control circuitry 24 operates as a controller of the computerized system 20 to perform certain programmed operations, e.g., to operate the computerized system 20 as a general purpose computer for one or more users, a host, a client or server, a data storage system, a data communications device, a compute engine, etc.

As shown in FIG. 1, the control circuitry 24 includes a set of processors 28 (one or more processors 28) and main memory 30 which couples to the set of processors 28. The main memory 30 stores a variety of memory constructs including an operating system 32 and additional code 34 (e.g., high-level applications, scripts, downloaded code, etc.). In some arrangements, the operating system 32 and the additional code 34 load into the main memory 30 through the interface 22 from computerized media 36 (e.g., CD-ROMs, diskettes, magnetic tape, propagated signals during network downloads, combinations thereof, and the like).

By way of example only, the shared resource 26 is sharable memory which is accessible by multiple threads or processes (hereinafter referred to as simply threads) running on the set of processors 28. Shared memory is typically used in symmetric-multiprocessor "SMP" systems (e.g., for coordinating access to critical code sections). Other suitable sharable resources 26 include logical devices, physical devices, and the like. It should be understood that the main memory 30 is capable of being formed from a combination of volatile memory (e.g., semiconductor memory) and non-volatile memory (e.g., disk drives), and that the shared memory is capable of residing in a contiguous or integrated manner with the main memory 30 (e.g., on one or more memory circuit boards containing semiconductor memory).

As will be explained in further detail with reference to other figures, threads 38 (and perhaps other threads and processes) simultaneously run on the control circuitry 24. The threads 38 are configured to access the shared resource 26 with a reliable load-store mutual exclusion mechanism 40 that does not require MEMBAR instructions in all of the threads 38. Such a synchronization mechanism 40 alleviates the need for the set of processors 28 to constantly guarantee that, when the multiple threads 38 are running in parallel, each thread 38 will be able to accurately view operations of the other threads 38 in correct order, thus enabling the system 20 to enjoy certain optimizations (e.g., processor design optimizations, interconnect optimizations, etc.) which offer the potential to improve overall system performance. Furthermore, such a synchronization mechanism 40 is capable of providing significant cycle savings by reducing or even alleviating the need for MEMBAR instructions in certain threads 38.

Examples of suitable processors architectures for the processors 28 include the SPARC® Architecture and the Intel IA32® Architecture. A description of the SPARC® Architecture is available in a document entitled "The SPARC Architecture Manual, Version 9" by Weaver and Germond, SPARC International, Prentice-Hall, 1994, the teachings of which are hereby incorporated by reference in their entirety. This manual provides details of the SPARC-V9 Architecture which defines a Total Store Order (TSO) memory model (e.g., see Appendix J, "Programming with Memory Models). Further details of the invention will now be provided with reference to FIGS. 2A and 2B.

FIGS. 2A and 2B show respective examples of two threads 38(1), 38(2) which are configured to run concurrently on the set of processors 28 of the computerized system 20 (also see FIG. 1). Both threads 38(1), 38(2) are configured to access the shared resource 26. In particular, the thread 38(1) (FIG. 2A) is configured to access the shared resource 26 on an occasional basis, and the thread 38(2) (FIG. 2B) is configured to access the shared resource 26 on a more frequent basis.

The threads 38(1), 38(2) coordinate access to the shared resource 26 using the load-store mutual exclusion mechanism 40 (FIG. 1). In particular, each thread 38(1), 38(2) is configured to access common memory variables or locations M(1), M(2) (collectively, memory variables M residing in the memory 30) using standard store and load instructions. If the thread 38(1) loads a non-zero value from the memory variable M(2), the thread 38(1) considers the thread 38(2) to have a lock on the shared resource 26. However, if the thread 38(1) loads a zero value from the memory variable M(2), the thread 38(1) considers the thread 38(2) to not have a lock on the shared resource 26. Similarly, if the thread 38(2) loads a non-zero value from the memory variable M(1), the thread 38(2) considers the thread 38(1) to have a lock on the shared resource 26. However, if the thread 38(2) loads a zero value from the memory variable M(1), the thread 38(2) considers the thread 38(1) to not have a lock on the shared resource 26.

As shown in FIG. 2A, the thread 38(1) (hereinafter referred to as the "slow thread" 38(1) because it does not access the shared resource 26 as often as the thread 38(2)), includes multiple code portions 50(1), 50(2) (collectively, code portions 50). When the slow thread 38(1) is ready to access the shared resource 26, the slow thread 38(1) runs the code portions 50. In particular, the code portion 50(1) is configured to request a lock on the shared resource 26 by storing a non-zero value into memory variable M(1) using a store instruction ST. The code portion 50(1) is further configured to direct the computerized system 20 to make operations of the other thread 38(2) visible in a correct order by running code 52 (e.g., a system call that changes protection of a page of memory) which forces other threads 38 to make their operations visible in the correct order. In response to the slow thread 38(1) running the code portion 50(1), the mechanism 40 makes operations of the thread 38(2) visible in the correct order (e.g., by flushing all store buffers or, at a minimum, the store buffer of the processor on which the thread 38(2) runs, etc.). The code portion 50(2) is configured to determine whether the slow thread 38(1) has obtained the lock on the shared resource 26 by loading the contents of the memory variable M(2) using a load instruction LD and checking the contents of the memory variable M(2). That is, if the contents of the memory variable M(2) is zero, the thread 38(1) has obtained the lock on the shared resource 26 and is configured to run additional code to access the shared resource 26. On the other hand, if the contents of the memory variable M(2) is non-zero, the slow thread 38(1) has not obtained the lock on the shared resource 26 and is configured to run further code that clears the memory variable M(1) and, either immediately or at a later time, retries to obtain the lock on the shared resource 26.

As shown in FIG. 2B, the thread 38(2) (hereinafter referred to as the "fast thread" 38(2) because it accesses the shared resource 26 more often than the slow thread 38(1)), includes a code portion 54 which is run when the fast thread 38(2) is ready to access the shared resource 26. In particular, the code portion 54 is configured to request a lock on the shared resource 26 by storing a non-zero value into memory variable M(2) using a store instruction ST. The code portion 54 is further configured to determine whether the thread 38(2) has obtained the lock on the shared resource 26 by loading the contents of the memory variable M(1) using a load instruction LD and checking the contents of the memory variable M(1). That is, if the contents of the memory variable M(1) is zero, the fast thread 38(2) has obtained the lock on the shared resource 26 and is configured to run additional code to access the shared resource 26. However, if the contents of the memory variable M(1) is non-zero, the fast thread 38(2) has not obtained the lock on the shared resource 26 and is configured to run subsequent code that clears the memory variable M(2) and, either immediately or at a later time, retries to obtain the lock on the shared resource 26.

At this time, it should be understood that the code portion 50(1) of the slow thread 38(1) includes a MEMBAR instruction between its store instruction ST and its load instruction LD. The MEMBAR instruction guarantees that the other threads 38 (e.g., the fast thread 38(2)) will observe the store instruction ST and the load instruction LD in the correct order, i.e., the store instruction ST before the load instruction LD. It will be further appreciated that the cycle cost associated with running the code portion 50(1), which includes the MEMBAR instruction, and the code portion 50(2) is not very high from a total overhead perspective since the slow thread 38(1) is configured not to access the shared resource very often.

Furthermore, it should be appreciated that the code portion 54 of the fast thread 38(2) does not include a MEMBAR instruction between its store instruction ST and its load instruction LD. The reason for the absence of a MEMBAR instruction in the code portion 54 is that there is no risk of an exclusion failure without a MEMBAR instruction. In particular, there is no need to guarantee that the store instruction ST and the load instruction LD of the fast thread 38(2) are visible in the correct order unless the slow thread 38(1) attempts to contend for access to the shared resource 26. If the slow thread 38(1) is not contending for access to the shared resource 26, whether the store instruction ST and the load instruction LD of the fast thread 38(2) are visible in the correct order does not matter. However, if the slow thread 38(1) is contending for access to the shared resource 26, the section of code 52 of the slow thread 38(1) forces the set of processors 28 to make the operations of the fast thread 38(2) momentarily appear in the correct order and visible to the slow thread 38(1) thus alleviating the need for the MEMBAR instruction in the fast thread 38(2). That is, in the rare instance that both the slow thread 38(1) and the fast thread 38(2) are attempting to gain access to the shared resource 26 at the same time (i.e., the code portions 50 of the slow thread 38(1) and the code 54 of the fast thread 38(2) are running substantially at the same moment), the code 52 of the slow thread 38(1) forces the store instruction ST and the load instruction LD of the fast thread 38(2) to be visible in the correct order (i.e., the store instruction ST ahead of the load instruction LD) thus guaranteeing proper operation of the synchronization mechanism 40 and preventing any exclusion failure.

As just explained, the overall effect is that the fast thread 38(2) does not need a MEMBAR instruction to protect the synchronization mechanism 40 against exclusion failures. The use of this synchronization mechanism 40 is profitable over a conventional Dekker scheme when the following inequity holds:

(fast thread iterations * cost(MEMBAR))>(slow thread iterations * cost(code 52)).

That is, when it is more expensive to run MEMBAR instructions during the frequent attempts by the fast thread 38(2) to access the shared resource 26 compared to running the code 52 of the slow thread 38(1) (also see FIG. 2A) which forces the operations of the fast thread 38(2) to momentarily appear in the correct order, it is more profitable to use the synchronization mechanism 40 over the conventional Dekker scheme. Accordingly, the synchronization mechanism 40 is particularly well-suited for situations where one thread 38 (i.e., the fast thread 38(2)) enters critical sections proportionally more frequently than another thread 38 (i.e., the slow thread 38(1)).

It should be understood that there are a variety of standard instructions currently available in off-the-shelf circuits which are well-suited to implement various aspects of the invention. For example, certain system calls which are provided by standard operating systems are designed to serialize execution before proceeding. To serialize execution means to drain all pending stores in the store buffer, making the stored values visible to other processors, and to cancel any instructions that are "in-flight" (i.e., instructions which are being executed speculatively, or in an out-of-order manner, but that have not yet committed or completed). Such a system call is suitable for use as the code 52 of the slow thread 38(1) in FIG. 2A.

For clarification, suppose that a fast thread F executes on a processor P, and slow thread S executes on a processor Q. In particular, suppose that the fast thread F includes code sequence "ST A; LD B" and that the slow thread S includes code sequence "ST B, MEMBAR, SERIALIZE(F); LD A". If the thread F happens to be executing in the "ST A; LD B" code sequence at the same time the thread S executes SERIALIZE (F) (see the code 52 in FIG. 2A), the SERIALIZE(F) causes the "ST A; LD B" code sequence (executed by thread F) to execute in-order. That is, SERIALIZE(F) (executed by thread S) prevents the "ST A; LD B" code sequence (executed by thread F) from being re-ordered.

The Windows operating system offered by Microsoft Corporation of Redmond, Wash. provides a Windows-based application program interface (API) called VirualProtect( ). This VirtualProtect( ) procedure is well-suited for the code 52 when the computerized system 20 is configured at least in part as a Windows-based platform.

Additionally, the Unix operating system provides a Unix-based procedure called mprotect( ). This mprotect( ) procedure is well-suited for the code 52 when the computerized system 20 is configured at least in part as a Unix-based platform. Further details of the invention will now be provided with reference to FIGS. 3 through 5.

Figure 3:
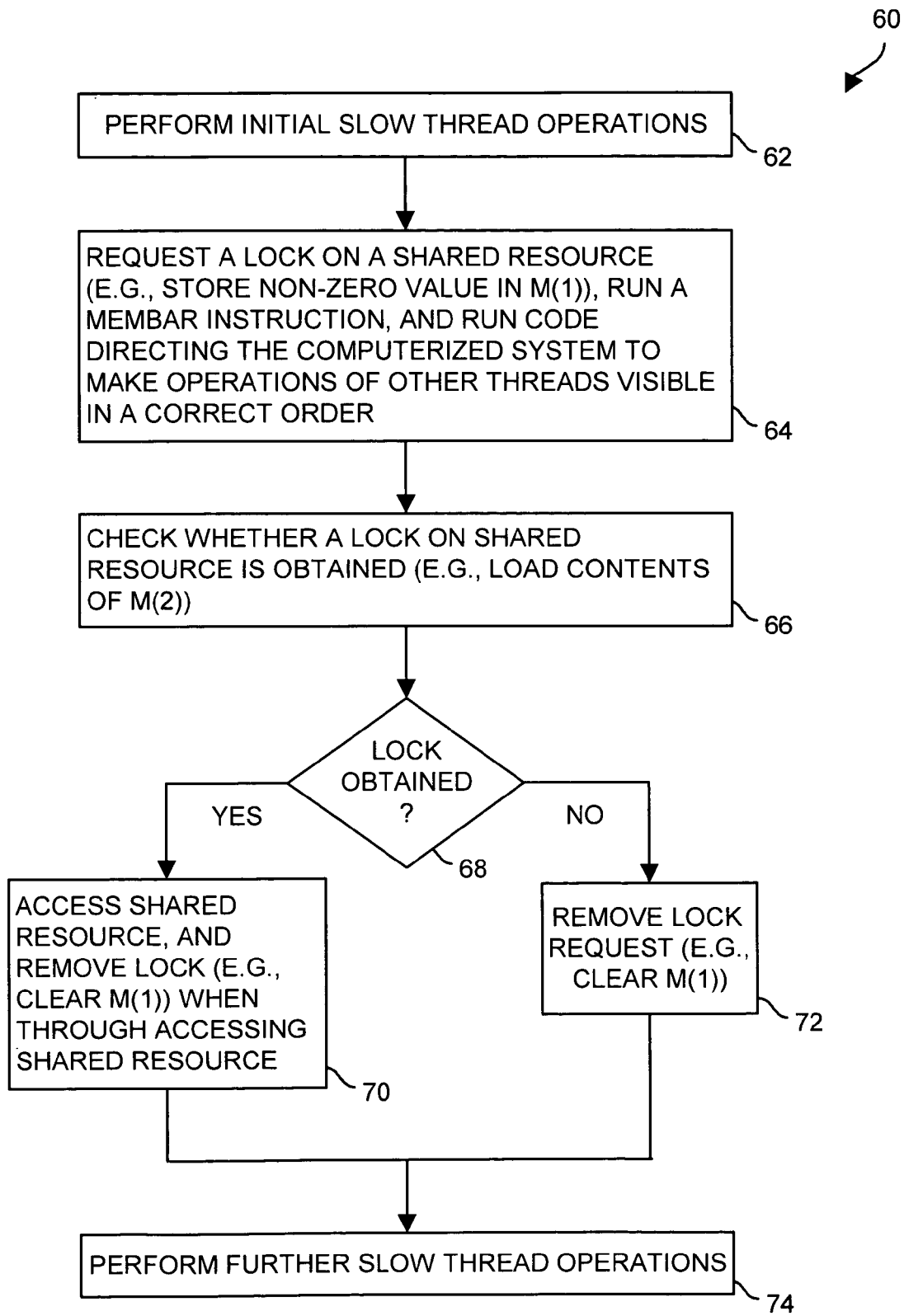
FIG. 3 is a flowchart illustrating the operation of a portion of the thread shown in FIG. 2A.

FIG. 3 is a flowchart 60 summarizing the operation of the slow thread 38(1). In step 62, the slow thread 38(1) performs initial operations leading up to the time when the slow thread 38(1) is ready to access the shared resource 26.

In step 64, the slow thread 38(1) requests a lock on the shared resource 26 (e.g., by storing a non-zero value in the memory variable M(1)), running a MEMBAR instruction, and running the code 52 directing the computerized system 20 to make the operations of other threads 38 visible in the correct order. Step 64 is also illustrated by the code portion 50(1) in FIG. 2A.

In step 66, the slow thread 38(1) checks whether a lock on the shared resource 26 is obtained (e.g., by loading the contents of memory variable M(2)). Recall, that the value or contents of memory variable M(2) are controlled by the fast thread 38(2).

In step 68, if the lock is obtained (e.g., if the value of memory variable M(2) is zero), step 68 proceeds to step 70. However, if the lock is not obtained (e.g., if the value of memory variable M(2) is non-zero), step 68 proceeds to step 72.

In step 70, the slow thread 38(1) accesses the shared resource 26 and, when through, removes the lock (e.g., by clearing the memory variable M(1)). After the slow thread 38(1) has removed the lock, the fast thread 38(2) is capable of accessing the shared resource 26.

In step 72, the slow thread 38(1) was unsuccessful at obtaining the lock and thus does not access the shared resource 26. Rather, the slow thread 38(1) removes the request for the lock (e.g., by clearing the memory variable M(1)). Nevertheless, the slow thread 38(1) is capable of retrying, i.e., trying again to obtain a lock and then access the shared resource 26.

In step 74, the slow thread 38(1) performs further slow thread operations. Such operations are capable of including subsequent performances of the procedure 60 in an ongoing or contiguous manner depending on the particular functions achieved by the slow thread 38(1).

Figure 4:
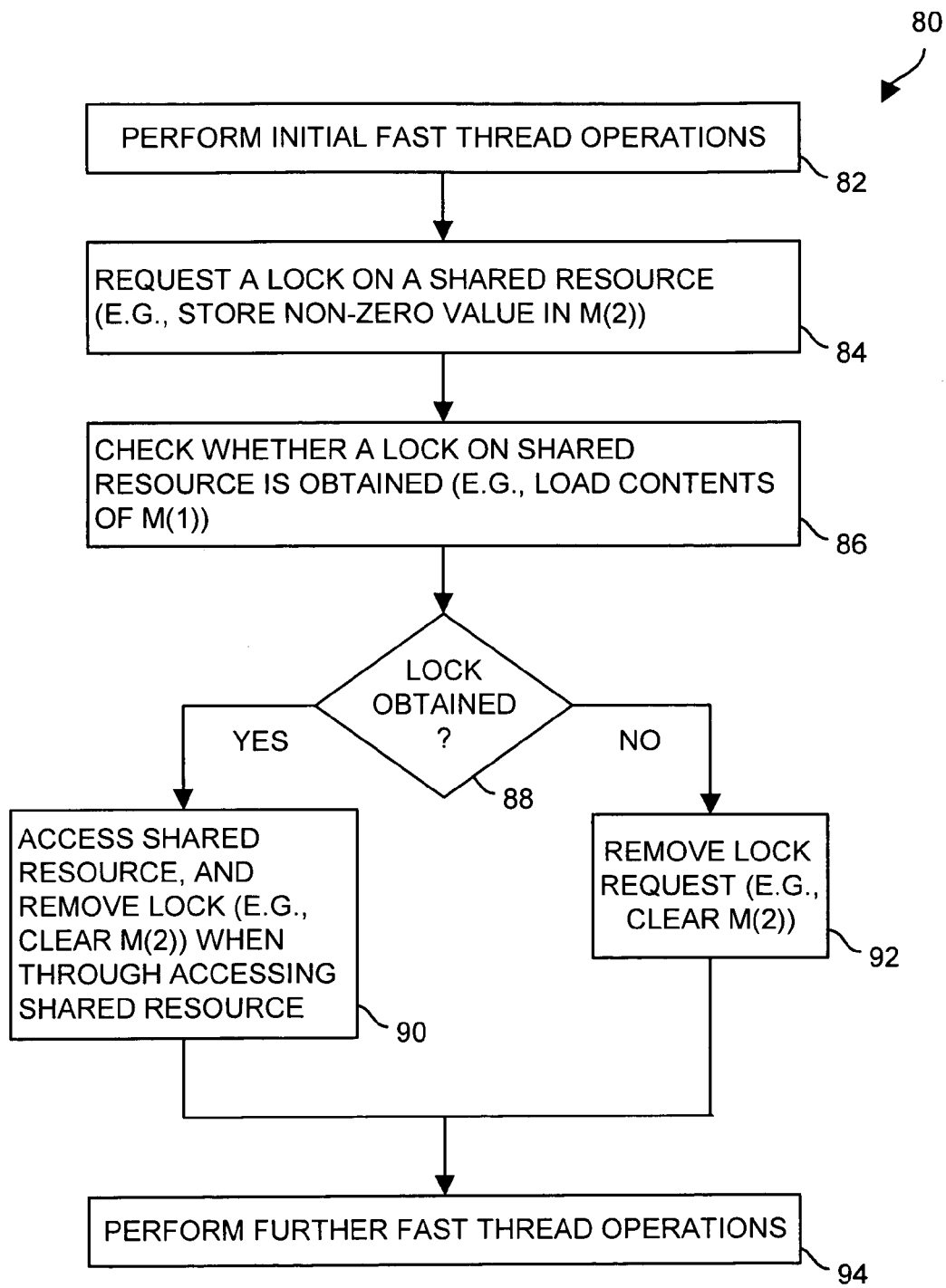
FIG. 4 is a flowchart illustrating the operation of a portion of the thread shown in FIG. 2B.

FIG. 4 is a flowchart 80 summarizing the operation of the fast thread 38(2). In step 82, the fast thread 38(2) performs initial operations leading up to the time when the fast thread 38(2) is ready to access the shared resource 26.

In step 84, the fast thread 38(2) requests a lock on the shared resource 26 (e.g., by storing a non-zero value in the memory variable M(2)). Step 84 is also illustrated by the store instruction ST within the code portion 52 in FIG. 2B.

In step 86, the fast thread 38(2) checks whether a lock on the shared resource 26 is obtained (e.g., by loading the value of memory variable M(1)). Recall, that the contents of memory variable M(1) are controlled by the slow thread 38(1).

In step 88, if the lock is obtained (e.g., if the value of memory variable M(1) is zero), step 88 proceeds to step 90.

However, if the lock is not obtained (e.g., if the value of memory variable M(1) is non-zero), step 88 proceeds to step 92.

In step 90, the fast thread 38(2) accesses the shared resource 26 and, when through, removes the lock (e.g., by clearing the memory variable M(2)). After the fast thread 38(2) removes the lock, the slow thread 38(1) is capable of accessing the shared resource 26.

In step 92, the fast thread 38(2) was unsuccessful at obtaining the lock and thus does not access the shared resource 26. Rather, the fast thread 38(2) removes the request for the lock (e.g., by clearing the memory variable M(2)). Subsequently, the fast thread 38(2) is capable of retrying, i.e., trying again to obtain a lock and then access the shared resource 26.

In step 94, the fast thread 38(2) performs further fast thread operations. Such operations are capable of including subsequent performances of the procedure 80 in an ongoing or contiguous manner depending on the particular functions achieved by the fast thread 38(2). Further details of the invention will now be provided with reference to FIG. 5.

Figure 5:
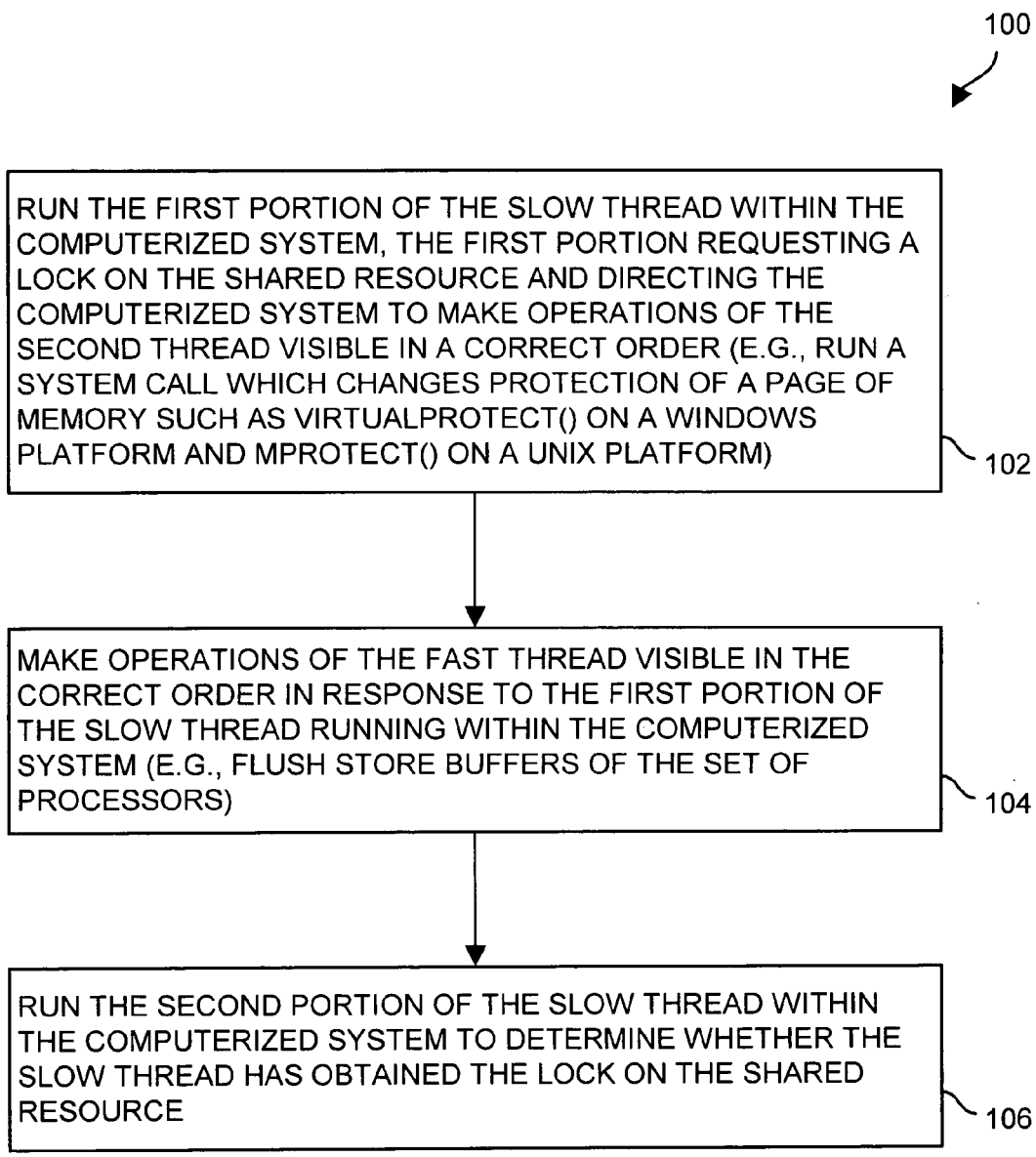
FIG. 5 is a flowchart illustrating the operation of the computerized system of FIG. 1 during operation of the threads of FIGS. 3 and 4.

FIG. 5 shows a flowchart 100 summarizing the operation of the control circuitry 24 (i.e., the set of processors 28 in conjunction with code stored in the main memory 30) when the slow thread 38(1) runs the code portions 50. In step 102, the control circuitry 24 runs the code portion 50(1) of the slow thread 38(1) (FIG. 2A) which (i) requests a lock on the shared resource 26 and (ii) directs the computerized system 20 to make operations of the fast thread 38(2) visible in a correct order (step 64 in FIG. 3). In particular, the code portion 50(1) includes a system call that results in the set of processors 28 purging their store buffers. In some arrangements, the system call is a VirtualProtect( ) operation carried out on a Windows-based platform. In other arrangements, the system call is an mprotect( ) operation carried out on a Unix-based platform.

In step 104, the control circuitry 24 responds to the code portion 50(1) by making the operations of the fast thread 38(2) visible to the slow thread 38(1) in the correct order in response to the code portion 50(1). This has the same functional affect of running a MEMBAR instruction within the fast thread 38(2) except that the fast thread 38(2) is not burdened with the excessive costs (e.g., more than 400 cycles) of a MEMBAR instruction.

In step 106, the control circuitry 24 runs the second portion 50(2) of the slow thread 38(1) (FIG. 2A) to determine whether the slow thread host obtained a lock on the shared resource 26 (step 68 in FIG. 3). As a result of the procedure 100, only the slow thread 38(1) includes a MEMBAR instruction and the associated cost is not that substantial since the code portions 50 attempting to access the shared resource 26 are not run very frequently. On the other hand, the fast thread 38(2) which tends to access the shared resource 26 more frequently enjoys significant savings since it does not need to run a MEMBAR instruction when accessing the shared resource 26.

As described above, embodiments of the invention are directed to techniques for accessing a shared resource 26 (e.g., shared memory) of a computerized system 20 using code 52 within a first thread 38(1) that forces operations of a second thread 38(2) to become visible in a correct order. The use of such code 52 alleviates the need to put a MEMBAR instruction in the second thread 38(2) as is commonly done in conventional synchronization approaches to avoid exclusion failures. As a result, if the second thread 38(2) tends to access the shared resource 26 on a frequent basis, significant cycles that would otherwise be used on the MEMBAR instruction are saved. Such techniques are particularly profitable in situations in which the second thread 38(2) accesses the shared memory 26 proportionally more frequently than the first thread 38(1).

While this invention has been particularly shown and described with references to preferred embodiments thereof, it will be understood by those skilled in the art that various changes in form and details may be made therein without departing from the spirit and scope of the invention as defined by the appended claims.

For example, it should be understood that the described above illustrated the synchronization mechanism 40 with two threads 38 by way of example only. It should be understood that the synchronization mechanism 40 is suitable for use in applications having more than two threads (or processes) as well. In particular, the load-store operations are easily extensible to configurations involving many threads 38 through the use of additional memory variables M (see the memory variables M(1), M(2) in FIGS. 2A and 2B in the simplified context of two threads 38). Such configurations involving more than two threads 38 are intended to belong to particular embodiments of the invention.

Additionally, it should be understood that the computerized system 20 was described above as having a centralized, multi-processor configuration by way of example only. In other arrangements, there is only a single processor running multiple threads or processes 38. In other arrangements, the computerized system 20 has a distributed topology rather than a centralized topology. Such modifications and enhancements are intended to belong to particular embodiments of the invention.

Furthermore, it should be understood that there are a variety of applications for the above-described synchronization mechanism. The following are a few examples in the context of a Java Virtual Machine (JVM), namely, Java monitors and JNI execution barriers. Such examples are intended to be for illustration purposes only.

Java Monitors

Java provides monitors for application-level synchronization. The particular implementation of monitors provided by the JVM author is critical to the performance of multi-threaded Java applications.

One way to improve the performance of Java monitors is to implement them with Quickly Reacquirable Locks (QRL). Examples of QRL are described in U.S. patent application Ser. No. 10/669,948, the teachings of which are hereby incorporated by reference in their entirety.

Along these lines, suppose that there are two threads 38 running on a JVM. The first thread 38 (i.e., a fast thread) is a bias-holding thread, and the second thread 38 (i.e., a slow thread) is attempting to remove the bias of a quickly reacquirable object (or simply object), as the shared resource 26 (also see FIG. 1). Revocation can be accomplished with safepoints, signals or thread suspension. For the purposes of this discussion, a brief recap of QRL will now be provided as well as an explanation of how to one is capable of efficiently implementing QRL with page-based protections using the above-described synchronization mechanism 40.

Each Java object has a "lock word" which indicates whether the object is locked or unlocked. At any given time an object can be locked by at most one thread. Traditionally, locking and unlocking a Java object both require CAS instructions for the un-contended case. However, in contrast to these conventional CAS instructions, Quickly reacquirable Locks (QRL) accelerate un-contended synchronization operations by eliminating the CAS instructions. In particular, the first time an object is locked, the object is "biased" toward the locking thread. Alternatively, the object toward a thread the very first time the object is unlocked. Once the object is biased toward a thread, that thread is capable of preferentially locking and unlocking the object with simple LD-UPDATE-ST operations on the lock word thus avoiding any need for CAS instructions.

In general, an object is capable of being biased to at most one thread 38 at a time. The thread 38 to which the object is biased is referred to as the bias-holding-thread 38 or the revokee thread 38 (since its bias is capable of being revoked) and is capable of locking and unlocking the object very efficiently. If another thread 38 which is referred to as the revoker thread 38 tries to lock the object while the object is biased toward the revokee thread 38, the revoker thread 38 needs to revoke or rescind the bias from the revokee thread 38. Once the bias is revoked subsequent synchronization operations on the object revert to the traditional monitor synchronization mechanism which employs CAS instructions.

It is relatively rare for more than one thread 38 to lock an object during the object's lifespan, so revocation, while expensive, will be relatively rare. Simple un-contended locking, which QRL accelerates by removing the CAS instruction, is extremely frequent in comparison.

To safely revoke bias, code designers make sure that the revokee and revoker threads 38 don't interfere with each other. The revokee thread 38 is the bias-holding-thread 38 because it is capable of locking and unlocking a biased object by mutating the object's lock word with a simple LD-UPDATE-ST sequence. To avoid interference, the revoker thread 38 arranges that (i) the revokee thread 38 is not currently in the midst of updating the object's lock word, and (ii) that during revocation the revokee thread 38 does not enter the "critical section" that updates the object's lock word.

It should be understood that QRL locking is "asymmetric." Biased lock and unlock operations are typically quite frequent while revocation is infrequent.

It should be further understood that, in the following examples, each thread 38 has a unique "Self" pointer which refers to a thread-specific data structure. This structure contains a RevokeinProgress field which is initially NULL (e.g., set to zero). Additionally, each object has a LockWord field. Furthermore, BIASUNLOCKED, BIASLOCKED, ISBIASEDBYOTHERTHREAD, ISBIASED, BIASEDTOWARD, ISFIRSTLOCK are helper routines that operate on object lock word values.

Also, each thread 38 has a unique virtual page, referred to as Self→VPage. VPage is normally allocated by mmap( ) on Unix-based or Linux-based platforms, and VirtualAlloc( ) on Windows-based platforms. The protections of VPage are adjustable using mprotect( ) on Unix or Linux, and VirtualProtect( ) on Windows. Further details will now be provided in the context of mprotect( ) operations although it should be understood that such details also apply to VirtualProtect( ) operations as well.

The mprotect( ) operations (and VirtualProtect( ) operations) must be synchronous. That is, mprotect( ) operations (and VirtualProtect( ) operations) do not return until the effect of the call has been made visible to all other processors, and any processors that might be concurrently accessing the same page have serialized execution. This property ensures that the modification to the page permissions are visible to all processors 28 (also see FIG. 1) before the mprotect( ) calls return to the caller (i.e., the code that invoked these operations). In addition, all pending store operations to the mprotect( )ed page must be made visible before the mprotect( ) returns. If this requirement were not true, then a thread could mprotect( ) a page to be read-only, but later observe data in the page because of latent store operations. Collectively, such operation is referred to as the "TLB coherence" property. In summary, before mprotect( ) returns to the caller, the new page permissions must be visible to all processors 28 in the system 20, and if the mprotect( ) call rescinds write permissions, then any latent but not yet visible store operations must be forced visible to at least the processor 38 calling mprotect( ).

Modern processors 38 usually have translation lookaside buffers, or TLBs, which are small hardware caches of virtual page protections and virtual-to-physical address mappings. TLBs accelerate virtual-to-physical address translation and protection checks. An mprotect( ) operation on a multiprocessor system (e.g., the system 20 in FIG. 1) must ensure that all TLBs, including those in other processors 38, that contain stale permissions are invalidated.

Typically, the kernel implements mprotect( ) by invalidating any TLBs on the current processor 38 and by sending "cross-calls" to the other processors 38, instructing them to invalidate their TLBs as well. Cross-calls are also referred to as x-calls or inter-processor interrupts. Cross-calls to perform TLB invalidation are sometimes called TLB shoot-downs.

Additionally, page protection traps, if taken, are precise and serialize execution on the processor 38 taking the trap. Any pending store operations are flushed to memory before the trap handler executes.

Furthermore, each VPage contains an InCrit variable and nothing else. InCrit is initially set to NULL. Store operations to Self→VPage→InCrit can trap in which case control diverts to a TrapHandlero routine.

The following lines of code are suitable for use in implementing the above-described QRL features. Such code is capable of initial taking the form of any Java style instructions for a JVM, e.g., Java Byte Code, Java script, executables, etc.

EXAMPLE 1

Quickly Reacquirable Locks Based on Page-Based Permissions

The following is a first Java monitor implementation of the above-described QRL features. Such an implementation is exemplary in nature and is well-suited for robust and reliable operation.

```
Lock (Object)
    // Enter QRL critical section
    // The ST to InCrit can trap into TrapHandler
    Self->VPage->InCrit = Object
    tmp = Object->LockWord
    if tmp == BIASEDUNLOCKED(Self)
        Object->LockWord = BIASEDLOCKED(Self)
        // Exit the QRL critical section
        // The ST to InCrit can trap into TrapHandler
        Self->VPage->InCrit = NULL
        return success
    Self->VPage->InCrit = NULL
        if ISBIASEDBYOTHERTHREAD(tmp)
            Revoke (Object)
        if ISFIRSTLOCK(tmp)
            // Attempt to bias the object toward Self.
            if CAS(&Object->LockWord, tmp, BIASEDLOCKED(Self) ==
            tmp)
                return success
        ... continue into traditional Lock code ...
Unlock (Object)
    Self->VPage->InCrit = Object    // Enter QRL critical section
    tmp = Object->LockWord
    if tmp == BIASEDLOCKED(Self)
```

-continued

```
      Object->LockWord = BIASEDUNLOCKED(Self)
      Self->VPage->InCrit = NULL    // Exit QRL critical section
      return success
   Self->VPage->InCrit = NULL
   ... continue into traditional Unlock code ...
Revoke (Object)
   LockWord = Object->LockWord
   if !ISBIASED(LockWord) return
   BiasHolder = BIASEDTOWARD(LockWord)
   pthread_mutex_lock (BiasHolder->RevokeMutex)
   Verify = Object->LockWord
   // Re-sample the lockword. It could have changed from BIASED to
   // non-biased state. Only the first revoker performs
   // revocation. When the 1st revoker resamples the lock-word it will
   // will still see the object in BIASED state. Subsequent revoke
   // attempts (revoking threads) will notice that the lockword changed
   // to non-BIASED and return quickly.
   if ISBIASED(Verify) AND BIASEDTOWARD(Verify) ==
   BiasHolder
      BiasHolder->RevokeInProgress = Object
      mprotect BiasHolder->VPage READONLY
      MEMBAR( )
      while (BiasHolder->VPage->InCrit == Object) SPIN( );
      Object->LockWord = UNBIAS (Object->LockWord)
      mprotect BiasHolder->VPage READWRITE
      BiasHolder->RevokeInProgress = NULL
   pthread_mutex_unlock (BiasHolder->RevokeMutex)
   TrapHandler( )
      // On Unix or Linux the TrapHandler( ) would be implemented with
// signals. On Windows the TrapHandler( ) would be implemented with
// either structured exception handling (SEH) or vectored exception
handling (VEH). MEMBAR( )
if Self->VPage->InCrit != NULL
   // In this case "Self" must be exiting a critical region and
   // the ST of NULL into Self->VPage->InCrit trapped.
   // Note that when we return from the trap handler we will
   // restart the offending ST. The redundant ST is benign.
   // Storing and re-storing a NULL into Self->VPage->InCrit
   // is an idempotent operation. (It's OK if we do it twice).
   mprotect Self->VPage READWRITE
   Self->VPage->InCrit = NULL
   while (Self->RevokeInProgess != NULL) SPIN( );
return // retry trapping ST
```

The above-described implementation used spinning for simplicity and illustration purposes only. In practice, a real implementation is capable of avoiding spinning by using POSIX pthreads condvars.

Additionally, to avoid an excessive trap rate on the store operations into Self→VPage→InCrit, code designers may choose to add an optimization where threads 38, which execute Lock( ) and Unlock( ), first load (LD) from Self→RevokeInProgress. If RevokeInProgress is non-zero, the thread 38 should block itself or spin. Such operation avoids the cost of the taken trap.

Furthermore, it should be appreciated that Dekker-duality is present. However, such duality is expressed in a subtle form.

Moreover, threads 38 calling Lock( ) and Unlock( ) first store (ST) into Self→VPage→InCrit. The processor 28 implements the store into InCrit as an atomic operation with following checks:

```
Load the permissions of pageof(Self->VPage->InCrit)
if permissions are READONLY then trap into TrapHandler( )
Store non-zero value into Self->VPage->InCrit
Additionally, the complementary code in Revoke( ) executes:
mprotect( ) :: Store into permissions of pageof(Self->VPage->InCrit)
MEMBAR
LD Self->VPage->InCrit
```

Critically, the storage used for page permissions, i.e., hardware translation lookaside buffer entries (TLBs) or software structures used to track and store virtual page permissions, are accessed in a sequentially consistent fashion by the hardware and operating system. At any given time all processors 28 must have the same "view" of page permissions.

Additionally, the mprotect(READONLY) executed by the revoker forces any potential pending store operations by the revokee into its InCrit field to become immediately visible to the revoker. More precisely, if the revokee executed a ST to its InCrit field before the mprotect, then that store operation will be visible to the revoker at the time the mprotect( ) call returns. If the revokee executes a store operation to its InCrit field after the mprotect( ) takes effect, the store operation will trap and the revoker will enter the TrapHandler( ). The mprotect( ) operation is a "linearization" point in that all store operations involved in the synchronization protocol can be said to occur either before or after the mprotect( ) request becomes effective. The mprotect(READYONLY) imposes a global ordering on store operations into InCrit.

Furthermore, the Revoke( ) operation can be rather expensive. Some pathological applications could be written such that revocation is common and the revocation costs exceed the benefit derived from QRL. To avoid this situation we would maintain global and per-thread revocation rate statistics. If the recent global or per-thread revocation rate exceeded some threshold, our implementation would suppress QRL by preventing a thread 38 from biasing objects toward itself.

In addition, our implementation could profile which allocation sites (i.e., locations in application code that allocate new objects) and which object types were vulnerable to pathological revocation. That information could, in turn, be used to inhibit the biasing of objects that are allocated at a certain site or that are of a certain type.

Also, in Revoke( ) above, after mprotect( )ing the InCrit page READONLY, if the revoking thread 38 observes that the revokee's InCrit field is equal to the object in question, then the revoker could simply restore the page protections to READWRITE and retry the operation later.

Additionally, the thread-specific RevokeMutex restricts the number of concurrent revokers to at most one. Likewise, an object can be biased to at most one thread at time, so the problem from N threads is reduced to just two threads 38, namely, the bias-holding-thread and a single revoker. Since the problem is reduced from N threads to just two threads 38, the threads 38 are now capable of employing a 2-thread/2-variable Dekker-type mechanism to coordinate the actions of the revoker and the revokee. This permits us to employ a 2-thread/2-variable Dekker-type mechanism to coordinate the actions of the revoker and the revokee. The two variables used by the protocol are the InCrit flag and, implicitly, the page-permissions associated with the InCrit page.

EXAMPLE 2

Quickly Reacquirable Locks Based on Page-Based Permissions

First, it should be understood that explicit memory barrier instructions are capable of being used to synchronize the revoker and the revokee. Briefly, the MEMBAR-based QRL lock appears as MEMBAR-based QRL operators.

```
Lock (Object)
 Retry:
  // Enter critical section ...
  Self->InCrit = Object
  MEMBAR( )
  if Self->RevokeInProgress = Object
    Self->InCrit = NULL
    Delay
    goto top
  // critical section ...
  tmp = Object->LockWord
  if tmp == BIASEDUNLOCKED(Self)
    Object->LockWord = BIASEDLOCKED(Self)
    Self->InCrit = NULL // Exit the critical section
    return success
  Self->InCrit = NULL
  if ISBIASEDBYOTHERTHREAD(tmp)
    Revoke (Object)
  if ISFIRSTLOCK(tmp)
    // Attempt to bias the object toward Self.
    if CAS(&Object->LockWord, tmp, BIASEDLOCKED(Self) == tmp)
      return success
  ... continue into traditional Lock code ...
Revoke (Object)
  LockWord = Object->LockWord
  if !ISBIASED(LockWord) return
  BiasHolder = BIASEDTOWARD(LockWord)
  pthread_mutex_lock (BiasHolder->RevokeMutex)
  Verify = Object->LockWord
  // Re-sample the lockword. It could have changed from BIASED to
  // non-biased state. Only the first revoker performs
  // revocation. When the 1st revoker resamples the lock-word it will
  // will still see the object in BIASED state. Subsequent revoke attempts
  // (revoking threads) will notice that the lockword changed to
  // non-BIASED and return quickly.
  if ISBIASED(Verify) AND BIASEDTOWARD(Verify) == BiasHolder
    BiasHolder->RevokeInProgress = Object
    MEMBAR( )
    while (BiasHolder->InCrit == Object) SPIN( );
    Object->LockWord = UNBIAS (Object->LockWord)
  pthread_mutex_unlock (BiasHolder->RevokeMutex)
```

The performance of the form above suffers because of the MEMBAR instructions. In contrast, this second example of QRL using the synchronization mechanism 40 uses page-based protection and TLB coherence to eliminate explicit MEMBAR instructions. In particular the above-described QRL MEMBARs are replaced with mprotect READONLY-READWRITE.

The following is a second Java monitor implementation of the above-described QRL features. Again, such an implementation is exemplary in nature and is well-suited for robust and reliable operation.

```
Lock (Object)
  // Enter QRL critical section
  // The ST to InCrit can trap into TrapHandler
  // Note that we ST into InCrit and then LD from RevokeInProgress
  // with no intervening MEMBAR.
  Retry:
  Self->VPage->InCrit = Object
  if Self->RevokeInProgress == Object
    Self->VPage->InCrit = NULL
    goto Retry
  // critical section ...
  tmp = Object->LockWord
  if tmp == BIASEDUNLOCKED(Self)
    Object->LockWord = BIASEDLOCKED(Self)
    // Exit the QRL critical section
    // The ST to InCrit can trap into TrapHandler
    Self->VPage->InCrit = NULL
    return success
  Self->VPage->InCrit = NULL
  if ISBIASEDBYOTHERTHREAD(tmp)
    Revoke (Object)
  if ISFIRSTLOCK(tmp)
    // Attempt to bias the object toward Self.
    if CAS(&Object->LockWord, tmp, BIASEDLOCKED(Self) == tmp)
      return success
  ... continue into traditional Lock code ...
Revoke (Object)
  LockWord = Object->LockWord
  if !ISBIASED(LockWord) return
  BiasHolder = BIASEDTOWARD(LockWord)
  pthread_mutex_lock (BiasHolder->RevokeMutex)
  Verify = Object->LockWord
  // Re-sample the lockword. It could have changed from BIASED to
  // non-biased state. Only the first revoker performs
  // revocation. When the 1st revoker resamples the lock-word it will
  // will still see the object in BIASED state. Subsequent revoke attempts
  // (revoking threads) will notice that the lockword changed to
  // non-BIASED and return quickly.
  if ISBIASED(Verify) AND BIASEDTOWARD(Verify) == BiasHolder
    BiasHolder->RevokeInProgress = Object
    MEMBAR( )
    mprotect BiasHolder->VPage READONLY
    mprotect BiasHolder->VPage READWRITE
    while (BiasHolder->VPage->InCrit == Object) SPIN( );
    Object->LockWord = UNBIAS (Object->LockWord)
    BiasHolder->RevokeInProgress = NULL
  pthread_mutex_unlock (BiasHolder->RevokeMutex)
TrapHandler( )
  // On Unix or Linux the TrapHandler( ) would be implemented with
  // signals. On Windows the TrapHandler( ) would be implemented with
  // either structured exception handling (SEH) or vectored exception
  // handling (VEH). We return immediately, simply retrying the
  // offending ST. MEMBAR( )
  return;
```

In this variant of Revoke( ), the two mprotect( ) calls are back-to-back. The mprotect(READONLY) operation serializes the execution of the revokee, i.e., a concurrent store operation into InCrit by the revokee will either be made visible to the revoker, or the ST will trap into the TrapHandler. Recall that memory-protection traps are precise. That is, if the store operation into InCrit occurs before the mprotect(READONLY) takes effect, then the mprotect(READONLY) will force the pending store operation, if any, to become visible to the revoking thread 38. On the other hand, if the store operation into InCrit occurs after the mprotect(READONLY) takes effect, then the store operation will trap into TrapHandler( ). Since memory-protection traps are precise and the store operation didn't complete, the load operation of RevokeInProgress, which follows the store operation in program order, could not have been re-ordered with respect to the prior store operation. After the revoker restores READWRITE protections to the page containing InCrit, the revokee will restart the store-load sequence, store into InCrit and load RevokeInProgress. The load operation of RevokeinProgress is guaranteed to observe the non-zero value previously stored by the revoker. The revokee is thus denied entry into the critical section.

EXAMPLE 3

Delay-Based Quickly Reacquirable Locks

QRLs may avoid MEMBARs and memory protection operations. The program order of the Lock( ) operation is store InCrit, and load RevokeInProgress. In a conventional system, without an intervening MEMBAR, the TSO memory model permits the load operation to bypass the store operation. If such a reordering occurs then the store operation might languish in the processors's write buffer while the load operation executes. The reordering opens a timing window where both a Lock( )ing thread 38 and some revoking thread 38 enter the QRL critical section at the same time. Specifically, in a conventional system, the following scenario is capable of occurring and should be avoided. In program order:

| Time | Revoker | Lock( )ing thread |
|---|---|---|
| 1 | | ST non-Zero into Self->InCrit |
| 2 | | LD Self->RevokeInProgress |
| 3 | ST t-> RevokeInProgress | |
| 4 | MEMBAR | |
| 5 | LD t->InCrit | |

At time (1) the store operation languishes in the store buffer of a processor and is not yet visible to other processors. At time (2) the load operation returns NULL/false. The Locking( ) thread enters the QRL critical section. At time (5) the load operation returns NULL/false as the store operation at time (1) is not yet visible to the revoker. The fetched value is stale. Unfortunately, both the revoking thread and the Lock( )ing thread have entered the QRL critical section at the same time. Such loss of exclusion must be avoided.

Note that if the race occurs then the load operation at time(2) completed and fetched NULL and the store operation at time (1) has retired, but is not yet visible to the revoker. Since the load operation at time(1) completed, it should be clear that all prior instructions, including the ST at (1) are "committed". The store operation will eventually become visible to a revoker. By inserting a sufficient delay between (4) and (5), a code designer can ensure that any store operation from time (1) will be visible at (5). Put another way, a precondition for the race is that the load operation at (2) fetches NULL. If the load operation fetches NULL then the store operation at (1) is committed and will eventually become visible.

The following is a third Java monitor implementation of the above-described QRL features. Again, such an implementation is exemplary in nature and is well-suited for robust and reliable operation.

```
Lock (Object)
 Retry:
  // ST InCrit then LD RevokeInProgess with no intervening MEMBAR.
  Self->InCrit = Object
  if Self->RevokeInProgress == Object
    Self->InCrit = NULL
    Delay( )
    goto Retry
  // critical section ...
  tmp = Object->Lock Word
  if tmp == BIASEDUNLOCKED(Self)
    Object->LockWord = BIASEDLOCKED(Self)
    // Exit the QRL critical section
    Self->InCrit = NULL
    return success
  Self->InCrit = NULL
  if ISBIASEDBYOTHERTHREAD(tmp)
    Revoke (Object)
  if ISFIRSTLOCK(tmp)
    // Attempt to bias the object toward Self.
    if CAS(&Object->LockWord, tmp, BIASEDLOCKED(Self) == tmp)
      return success
  ... continue into traditional Lock code ...
Revoke (Object)
  LockWord = Object->LockWord
  if !ISBIASED(LockWord) return
```

-continued

```
BiasHolder = BIASEDTOWARD(LockWord)
pthread_mutex_lock (BiasHolder->RevokeMutex)
Verify = Object->Lock Word
// Re-sample the lockword. It could have changed from BIASED to
// non-biased state. Only the first revoker performs
// revocation. When the 1st revoker resamples the lock-word it will
// will still see the object in BIASED state. Subsequent revoke attempts
// (revoking threads) will notice that the lockword changed to
// non-BIASED and return quickly.
if ISBIASED(Verify) AND BIASEDTOWARD(Verify) == BiasHolder
  BiasHolder->RevokeInProgress = Object
  MEMBAR( )
  DelayForMaximumStoreBufferLatency( )
  while (BiasHolder->InCrit == Object) SPIN( );
  Object->Lock Word = UNBIAS (Object->LockWord)
  BiasHolder->RevokeInProgress = NULL
pthread_mutex_unlock (BiasHolder->RevokeMutex)
```

Here, it should be understood that the back-to-back mprotect( ) operations were replaced with a delay. It should be ensured that the load operation of Self→RevokeInProgess in Lock( ), above, can't be satisfied by a look-aside into the store buffer. To prevent this, a code designer can establish the invariant that either the Lock( )ing thread never stores into RevokeInProgress, or if it does, it insures that a MEMBAR occurs between the store operation and the load operation in Lock( ).

Furthermore, it should be understood that the actual delay interval in DelayForMaximumStoreBufferLatency( ) is system-dependent. The delay exists and is bounded for any system. If the delay is set too short the revoker and the revokee can race, resulting in an exclusion failure. If the delay is too long we introduce unnecessary latency in the Revoke( ) operation.

Additionally, it should be understood that the thread 38 executing Revokeo does not have to be idle during the "DelayForMaximumStoreBufferLatency" interval. Rather, that thread 38 is capable of accomplishing other useful work.

Moreover, it should be understood that there are alternatives to DelayForMaximumStoreBufferLatency( ). For example, instead of waiting for the remote store buffer to drain, the revoker can send a Unix signal to the revokee. The signal handler can issue a MEMBAR and notify the revoker that the MEMBAR is complete. After sending the signal, the revoker must wait for acknowledgement from the revokee, guaranteeing that the MEMBAR has competed. In this way the revoker is capable of forcing the revokee to execute a MEMBAR. In this example, note that signals have some undesirable properties as not all code is signal-safe.

As another example, instead of sending signals to the revokee, signals can be sent to dedicated "martyr" threads 38. In this example, each processor 28 in the system 20 has a dedicated martyr thread 38 "bound" to that processor 28. Once bound to a processor 28, a martyr thread 38 is only allowed to run on that processor 28. The revoker sends signals to all the martyr threads 38 on the system 28 and then waits for all the signal handlers to acknowledge. The signal handlers execute a MEMBAR before acknowledging the revoker. Once all signal handlers have acknowledged, the revoker is assured that any latent remote store operations had become visible. Accordingly, the martyr threads 38 are dedicated, serving no other purpose. As such, it is easy to make them signal-safe.

As yet another example (i.e., a variation of this last example), if the revoking thread 38 can determine the identity of the last processor 28 on which the revokee was dispatched, such as through Solaris' "schedctl" interface or through the "/proc" filesystem, then the revoker can send a signal to just the martyr thread 38 associated with that processor. Solaris is offered by Sun Microsystems Inc. of Santa Clara, Calif. Note that the revokee might migrate to another processor 28 between the time the revoker sampled the ID of the processor 28 and the time the revoker sends the signal to the martyr thread 38. This is benign, as migration or context switching activities also serialize execution. In any case, if the revokee is still running on the processor 28, if the revokee has migrated to another processor 28, or if the revokee has been preempted, then we know that all latent store operations by the revokee are flushed and visible to the revoker.

As another example which is similar to the last two martyr thread examples described above, the signals use native synchronization primitives to cause context switching to martyr threads 38 bound to processors 28. Specifically, the revoker sends messages to the martyr threads 38 bound to all processors 28 (or, as a refinement to the specific processor 28 on which the revokee was last dispatched). The revoker then waits for acknowledgement of all the messages it sent. Upon receipt of all acknowledgements, the revokee knows with certainty that context switching has occurred on the processor 28 where the revokee last ran. Since context switching implies that the store buffers were flushed, the revoker then knows that any store operations by the revokee to its InCrit field are visible.

As yet another example, the "schedctl" interface provides a so-called "sc_state" field (in addition to a "sc_cpu" field). The contents of the "sc_state" field indicate whether the associated thread is "ONPROC" (i.e., running on a CPU) or not. As a refinement to the previous examples, the revoker can avoid sending *any* signals to martyrs threads (or, alternately context switching to martyr threads) if the "sc_state" field of the bias-holding-thread indicates that the bias-holding-thread is not ONPROC. If a thread is not ONPROC then all its user-mode STs are visible to other processors and the thread can not have any instructions in-flight.

JNI Execution Barriers in a Java Virtual Machine

A Java application consists of one or more "mutator" or application threads (e.g., see the threads 38 of FIGS. 1, 2A and 2B which are suitable for use in Java applications). Such threads access objects in the Java heap. When garbage collection (GC) of the heap must be performed, the collector typically stops all the mutator threads, i.e., a stop-the-world collection. The threads must be stopped otherwise both the mutators and the collector could attempt to concurrently access objects in the heap, resulting in unfortunate and undesirable interference. To avoid interference the collector stops all the mutator threads.

In general, the delay-based and mprotecto-based mechanisms operate on the following principle. The bias-holding-thread executes {ST Self→InCrit; LD Self→RevokeInProgress} with no intervening memory barrier instruction. In such a situation, the ST can reorder with the LD such that the LD completes while the ST is pending and is not yet visible to other processors. This scenario, which the mechanism 40 prevents, would otherwise lead to exclusion failure. In contrast, the mechanism 40 used by the revoker (e.g., mprotecto, signals, cross-calls, context-switching, etc.) ensures that, if the bias-holding-thread is executing in the key ST;LD sequence, that either the ST into Self→InCrit will become visible to the revoker or that the subsequent LD of Self→RevokeInProgress by the bias-holding-thread will observe the non-NULL value previously set the revoking thread.

It should be understood that synchronization between mutators must be performed explicitly with volatile fields and Java monitors, while synchronization between mutators and the collector is handled automatically by the JVM transparently to the mutators. Once the mutators are stopped, they remain stopped for the duration of the collection. When the collection is complete, the collector permits the stopped mutators to resume execution.

Mutator threads can also call out of Java code and into native C code by way of the Java Native Interface (JNI). When a thread calls out, it becomes a non-mutator. To increase potential parallelism between the collector and threads that have called out, the collector does not stop such threads. The JVM does, however, erect a logical execution barrier that prevents such threads from reentering the JVM (and becoming a mutator) while a collection is in progress.

The JNI reentry barrier prevents threads that are "outside" the JVM on JNI calls from reentering Java code while a collection is in-progress. In particular, as a thread returns back from a JNI call into Java code, the thread passes through the JNI reentry barrier. If collection is in-progress, the barrier halts the thread until the collection completes. Such operation prevents the thread from mutating the heap concurrently with the collector.

In conventional systems, the JNI reentry barrier is commonly implemented with a CAS or a Dekker-like "ST;MEMBAR;LD" sequence to mark the thread as a mutator (the store operation or ST) and check for a collection in-progress (the load operation or LD). Some applications, such as graphics intensive applications, call out repeatedly to short duration native methods. In this case, a MEMBAR instruction in the JNI reentry path significantly impacts performance.

The JNI reentry path is a special case of synchronization where the mutator and collector must coordinate their activities. Shown below are examples as to how the synchronization mechanism 40 of the computerized system 20 (also see FIG. 1) can be used to accelerate the JNI reentry path, allowing removal of the MEMBAR instruction. The mutator-collector synchronization for JNI reentry mechanism is asymmetric in that call-outs, via JNI, occur frequently but collections are relatively infrequent. The JNI reentry path is capable of being sped up by removing the MEMBAR instruction but at the cost of adding code and expense to the path used to initiate a collection.

Some modern "on the fly" collectors stop threads individually instead of all threads simultaneously. Optimally, the JNI reentry barrier should provide support for both stop-the-world and stop-the-thread collectors. The ability to stop individual threads at the JNI reentry barrier is also useful for Java-level thread suspension and Java debuggers.

The collector stops threads that are executing in Java code with a mechanism distinct from the JNI reentry barriers. Threads in Java code must periodically poll or check a garbage-collection-pending flag. If the flag is set, the thread stops itself and notifies the collector. The collection can proceed only after all threads executing in Java have stopped themselves. To assist the collector, the JNI reentry barrier must also track the state of mutator threads so the collector can determine if a particular thread is out on a JNI call or executing within Java code. If the thread is executing in Java code, the collector will rendezvous with the thread in a cooperative fashion (setting a flag "asking" for the thread to stop and then waiting for the thread to acknowledge the request). In contrast, if the thread is executing outside Java code (out on a JNI call), the collector erects the JNI barrier to ensure the thread can not resume executing Java code while the collection is in-progress.

In the examples below, each thread has an "InJava" flag indicating whether the thread is currently executing out of the JVM on a JNI call into native code, or within the JVM, as a normal mutator. The mutator thread writes to this flag and the collector thread reads the flag. Similarly, each thread has private "Halt" flag. The collector thread writes a "Halt" flag and the mutator thread reads the "Halt" flag. As will now be explained in further detail, the threads 38 of the computerized system 20 are well suited for enabling the collector and a mutator to synchronize with those two variables, i.e., the InJava and Halt flags.

The following illustrates implementation of the JNI reentry barrier using a MEMBAR instruction.

JNIReentry( )
ST 1, Self→InJava
MEMBAR
LD Self→Halt
if non-zero, goto StopSelf

EXAMPLE 4

JNI Execution Barrier in a Java Virtual Machine

The following is a first JNI execution barrier example which is exemplary in nature and is well-suited for robust and reliable operation. In this example, each thread 38 has a private dedicated virtual page which contains its InJava flag. The sole variable in the page is the InJava field. Permissions on the page can be changed via mprotecto. The thread's "Slot" variable points to the thread's page. In this case the "Halt" flag is encoded in the permissions of the thread's page.

```
JNIReentry( )
    // If the ST traps, control vectors into TrapHandler( ).
    ST 1, Self->Slot->InJava
TrapHandler( )
    Wait for any concurrent collection to complete
    return;      // retry the ST
Collector( )
    // Stop-the-world
    for each mutator thread t
        mprotect pageof(t->Slot) READONLY
        if t->Slot->InJava then StopMutatorCooperatively(t)
    CollectJavaHeap( )
    for each mutator thread t
        mprotect pageof (t->Slot) READWRITE
```

As shown, to reduce the number of mprotect( ) system calls and the number of cross-calls, the per-thread InJava pages can be grouped together into contiguous sets. One mprotect( ) operation can then set the permissions for multiple InJava pages. The loops in Collector( ), above, could be replaced with single or fewer mprotect( ) calls.

```
Collector( )
    mprotect all mutator InJava pages READONLY
    for each mutator thread t
        if t->Slot->InJava then StopMutatorCooperatively(t)
    CollectJavaHeap ( )
    mprotect all mutator InJava pages READWRITE
```

Here, there is support for both stop-the-world and stop-the-thread. To erect the JNI execution barrier for an individual thread 38, the code designer simply uses mprotect(READONLY) on the page containing the mutator's InJava flag.

EXAMPLE 5

JNI Execution Barrier in a Java Virtual Machine

The following is a second JNI execution barrier example which is exemplary in nature and is well-suited for robust and reliable operation. In this example, the JVM maintains a set of InJava "container" pages. Each page is divided into cache lines and each cache line is associated with at most one thread 38. A thread's InJava flag resides in the cache line associated with the thread 38. It should be understood that the page is divided into cache lines to prevent false sharing of the InJava fields. The thread's "Slot" variable points to the thread's cache line which resides in one of the container pages.

```
JNIReentry( )
    ST 1, Self->Slot->InJava
TrapHandler( )
    Wait for any concurrent collection to complete
    return;      // retry the ST
Collector( )
    // stop-the-world
    mprotect all InJava container pages READONLY
    CollectJavaHeap ( )
    mprotect all InJava container pages READWRITE
```

This second JNI example improves on the first JNI example in that collector needs to mprotect( ) many fewer pages for a stop-the-world collection. Additionally, stop-the-thread collection is impractical in this second JNI example. Since the container pages are shared, containing the InJava flags for multiple threads 38, if the collector changes the protection of the container associated with one thread 38, it can cause other unrelated threads 38 to trap in JNIReentry( ).

EXAMPLE 6

JNI Execution Barrier in a Java Virtual Machine

The following is a third JNI execution barrier example which is exemplary in nature and is well-suited for robust and reliable operation. This example is similar to the first JNI example (see Example 4 above) in that each thread 38 has a private InJava page.

```
JNIReentry( )
    ST 1, Self->Slot->InJava
    LD Self->Halt
    if non-zero goto StopSelf
TrapHandler( )
    Wait for any concurrent collection to complete
    return;      // retry the ST
Collector( )
    // stop-the-world
    for each mutator thread t
        t->Halt = 1
        MEMBAR( )
        mprotect pageof(t->Slot) READONLY
        mprotect pageof(t->Slot) READWRITE
        if t->Slot->InJava then StopMutatorCooperatively(t)
    CollectJavaHeap ( )
    for each mutator thread t
        t->Halt = 0
        Wake(t)       // Wake mutator t if it is blocked
```

It should be understood that the above-provided pseudo code wakes up threads that are blocked in TrapHandler( ) or stopped by StopMutatorCooperatively( ). Wake(t) restarts a mutator thread if it is stopped in Traphandler/StopSelf or by StopMutatorCooperatively( ).

It should be further understood that, compared to the first two JNI examples, this third JNI example reduces the trap rate as the pages are mprotect-ed READONLY only for a brief interval. To further reduce the trap rate, The JNIReentry can be enhanced to opportunistically check Self→Slot before storing into Self→Slot→InJava. This optimization does not eliminate traps, but it greatly reduces the timing window where trap might occur.

```
JNIReentry( )
    LD Self->Halt              // optimization ...
    if non-zero goto StopSelf  // optimization ...
    ST 1, Self->Slot->InJava
    LD Self->Halt
    if non-zero goto StopSelf
```

This mechanism is analogous to the second QRL example (see Example 2 above). Furthermore, this example supports both stop-the-thread and stop-the-world collectors.

EXAMPLE 7

JNI Execution Barrier in a Java Virtual Machine

The following is a fourth JNI execution barrier example which is exemplary in nature and is well-suited for robust and reliable operation. This example is similar to the second JNI example (see Example 5 above) in that this example uses shared InJava pages. The mutators and collectors use a protocol similar to that used the third JNI example (see Example 6 above).

```
JNIReentry( )
    ST 1, Self->Slot->InJava
    LD Self->Halt
    if non-zero goto StopSelf
TrapHandler( )
    Wait for any concurrent collection to complete
    return; // retry the ST
Collector( )
    // stop-the-world
    for each mutator thread t
        t->Halt = 1
    MEMBAR( )
    mprotect all mutator InJava pages READONLY
    mprotect all mutator InJava pages READWRITE
    for each mutator thread t
        if t->Slot->InJava then StopMutatorCooperatively(t)
    CollectJavaHeap ( )
    for each mutator thread t
        t->Halt = 0
        Wake(t) // Wake mutator t if it is blocked
```

To further reduce the trap rate, JNIReentry can be enhanced to speculatively check Self→Slot before storing into Self→Slot→InJava. This optimization does not eliminate traps, but it greatly reduces the timing window where the trap might occur.

```
JNIReentry( )
    LD Self->Halt // optimization ...
    if non-zero goto StopSelf // optimization ...
    ST 1, Self->Slot->InJava
```

```
    LD Self->Halt
    if non-zero goto StopSelf
```

This example supports both stop-the-thread and stop-the-world collectors. To stop an individual thread, mprotect (READONLY) must protect the shared page which contains the thread's InJava flag. While the page is READONLY, other threads which share the page could attempt to store into their InJava fields, generating a trap. This is "false trap" in that the trapping thread is not being stopped.

To tolerate false traps, one of the following measures can be taken. First, a thread 38 incurring a false trap could block in its TrapHandler( ), waiting for the memory protections on the shared page to be restored. Note that the collector sets the page permissions to READONLY and then immediately restores the protections to READWRITE. As such, the delay waiting for the permissions to return to READWRITE should be short.

As a alternative measure, a thread 38 incurring a false trap could proactively restore the protections of the shared page to READWRITE with mprotect( ). The thread 38 could then proceed, restarting the trapping ST instruction. There is no loss of exclusion.

As yet another alternative measure, the trap handler would deflect control into an alternate JNIReentry path that used "ST;MEMBAR;LD Self→Halt". Variously, the ST instruction in the alternate path could store into Self→InJava via an alternate READWRITE virtual mapping, or the ST could be performed to an alternate set of InJava flags (e.g., ST 1, Self→AltInJava).

EXAMPLE 8

JNI Execution Barrier in a Java Virtual Machine

The following is a fifth JNI execution barrier example which is exemplary in nature and is well-suited for robust and reliable operation. This example is similar to the third JNI example (see Example 6 above). Here, the mprotecto operations in above-provided examples are replaced with delays, signals or forced context switching.

For example, suppose that the collector has access to a schedctl-like interface through which the collector can determine the last CPU on which the mutator was dispatched and the current scheduling state of the mutator. Accordingly, a stop-the-world collection is capable of being optimized as follows.

```
JNIReentry( )
    ST 1, Self->InJava
    LD Self->Halt
    if non-zero goto StopSelf( )
Collector( )
    for each cpuid
        Flushed[cpuid] = 0
    for each mutator thread t
        t->Halt = 1
    MEMBAR( )
    for each mutator thread t
        if SCHEDCTL_ISEXECUTING(t) && !t->InJava then
            cpuid = SCHEDCTL_CURRENTCPU(t)
            if (!Flushed[cpuid])
                Flushed[cpuid] = 1;
                ContextSwitchTo (cpuid);
        else
```

```
        if t->InJava
            StopMutatorCooperatively (t)
    CollectJavaHeap( )
    for each mutator thread t
        t->Halt = 0
        Wake(t) // Wake mutator t if it is blocked
```

The SCHEDCTL_ISEXECUTING and SCHEDCTL_CURRENTCPU primitives use the schedctl subsystem or the Solaris "/proc" filesystem to inspect the mutator's scheduling state. ContextSwitchTo( ) causes a context switch to a dedicated marytr thread 38. By using schedctl, the number of context switches required in Collector( ) is bound to at most the number of processors or CPUs 28 instead of the number of mutator threads 38.

EXAMPLE 9

JNI Execution Barrier in a Java Virtual Machine

The following is a sixth JNI execution barrier example which is exemplary in nature and is well-suited for robust and reliable operation. In this example, each thread 38 has private InJava and Halt fields. The JVM also provides a global "BarPage" virtual page.

```
JNIReentry( )
    // The ST into BarPage will trap into TrapHandler( ) if the page is
    READONLY.
    ST 1, Self->InJava
    ST 0, BarPage[(Self->ThreadID * CACHELINESIZE) &
    (PageSize-1)]
    LD Self->Halt
    if non-zero goto StopSelf
JNIReentry_SLOW( )
    ST 1, Self->InJava
    MEMBAR
    LD Self->Halt
    if non-zero goto StopSelf
TrapHandler( )
    Deflect control to JNIReentry_SLOW
    return; // retry the ST
Collector( )
    // stop-the-world
    for each mutator thread t
        t->Halt = 1
    PageArmed = TRUE
    MEMBAR( )
    mprotect the single BarPage READONLY
    mprotect the single BarPage READWRITE
    PageArmed = FALSE
    for each mutator thread t
        if t->InJava then StopMutatorCooperatively(t)
    CollectJavaHeap( )
    for each mutator thread t
        t->Halt = 0
        Wake(t) // Wake mutator t if it is blocked
```

This example supports both stop-the-world and stop-the-thread. For stop-the-thread use, unrelated threads 38 can incur spurious false-traps if the BarPage happens to be in READONLY state. In this case, the TrapHandler( ) is capable of directing control flow into JNIReentry_SLOW( ) which uses a traditional MEMBAR instruction.

Furthermore, an optimization to reduce the rate of false-traps would be to change JNIReentry( ) to opportunistically check TrapArmed before storing into BarPage. This optimization does not completely eliminate traps but it greatly reduces the timing window where traps might occur.

```
JNIReentry( )
    LD TrapArmed
    if non-zero goto JNIReentry_SLOW( )
    // The ST into BarPage will trap into TrapHandler( )
    // if the page is READONLY.
    ST 1, Self->InJava
    ST 0, BarPage[(Self->ThreadID * CACHELINESIZE) &
    (PageSize-1)]
    LD Self->Halt
    if non-zero goto StopSelf
```

In order to reduce cache line migration, the stores are diffused into BarPage by conditioning the address with a thread-specific page offset. Note that the following expression can be pre-computed:

$$Self{\rightarrow}ThreadID*CACHELINESIZE)\&(PageSize-1)$$

As shown above, the explicit MEMBAR instruction in the classic JNIReentry( ) routine has been replaced with a dummy store to a potentially trapping page. If the mprotect (BarPage,READONY) is effective before a mutator STs into BarPage, then the ST will trap and the mutator will be safely excluded. If the mprotect(BarPage,READONLY) is effective after a mutator STs into BarPage, then value stored into BarPage must be visible to the collector thread by virtue of the "TLB coherence" property. Since the store to BarPage is visible, then by TSO it is clear that the mutator's prior store to Self→InJava will also be visible to the collector.

Having thus completed the discussion for Example 9, it should be noted that one must to be careful not to make assumptions about the implementation of mprotecto. Specifically, mprotect( ) isn't always guaranteed to perform a cross-call so, unless one is clever, it cannot be depended on to stand in as "remote membar". First, some operating systems such as Solaris optimize mprotect( ) to restrict the x-calls to only those processors or CPUs 28 that might have the associated TLB entry loaded. Second, there are mprotect/shoot-down optimizations that take advantage of lazy permission promotion.

Additionally, suppose that a thread 38 on CPU#1 calls mprotect(NONE) on a RW page that's mapped by other CPUs. Typically, the kernel will x-call to the other CPUs to shoot-down the TLB and downgrade the permissions. This all happens synchronously before mprotecto returns. The thread on CPU#1 then calls mprotect(READWRITE) on the same page. In this case the kernel can skip the x-calls. The key point is that the *physical* permission on the page and TLB must be a subset of the *virtual* permissions. If a thread 38 on another CPU happens to reference the page, the LD or ST will trap and the kernel will quietly promote the physical permissions in the TLB. Assuming that there were no intervening remote references, if the thread 38 on CPU#1 calls mprotect (NONE) the kernel may be able to optimize the operation and avoid any x-calls.

In some arrangements, the synchronization mechanism 40 is designed to rely on TLB coherence properties, and not on any imputed TLB shoot-down cross-calls (e.g., interprocessor interrupts). Such cross-calls would certainly serialize execution, it is not guaranteed that the operating will generate a cross-call for each mprotect( ) request.

For clarity of exposition the above-provided examples were described in the context of a Java Virtual Machine. The concepts are also applicable to managed environments other than Java, such as Microsoft's NET CLR (Common Language Runtime). The mutual exclusion mechanisms described above are also applicable to POSIX pthreads mutexes, and the like.

Additionally, it should be understood that the examples provided above were provided in the context of the Total Store Order (TSO) memory model of the SPARC® Architecture. In the context of the SPARC® Architecture, TSO is the default and is also the strongest model in that it permits the least re-ordering. In fact the only reordering that can occur in TSO is, when a program excutes (ST A; LD B;), the processor is permitted to make the ST visible after the LD executes. From the perspective of other processors, the program executed (LD B; ST A). Without the availability of the mechanism 40, such reordering of the ST and LD necessitates the insertion of the expensive MEMBAR instruction.

Furthermore, it should be understood that the techniques of the various embodiments of the invention are not restricted to TSO and the SPARC® Architecture. Other architectures are suitable for use by the invention as well. Such modifications and enhancements are intended to belong to various embodiments of the invention.

What is claimed is:

1. A method for accessing a shared resource of a computerized system, the method comprising:
    running a first portion of a first thread within the computerized system, the first portion (i) requesting a lock on the shared resource and (ii) directing the computerized system to make operations of a second thread visible in a correct order, the correct order preventing an exclusion failure, the first portion of the thread representing at least instructions that perform the steps of requesting and directing;
    making operations of the second thread visible in the correct order in response to the first portion of the first thread running within the computerized system, the second thread visible to at least one other processor; and
    running a second portion of the first thread within the computerized system to determine whether the first thread has obtained the lock on the shared resource, the second portion of the thread representing at least one instruction that performs the step of determining whether the first thread has obtained the lock on the shared resource;
    wherein running the first portion of the first thread includes:
    performing a store operation which stores a lock request value in a memory variable which is accessible by both the first and second threads;
    performing a memory barrier operation which guarantees execution of the store operation before a next operation; and
    performing, as the next operation, a system call which directs the computerized system to make operations of the second thread visible in the correct order;
    wherein performing the system call includes:
    executing operating system code to change protection of a page of memory of the computerized system.

2. The method of claim 1 wherein running the second portion of the first thread includes:
    performing a load operation which loads contents of another memory variable which is accessible by both the first and second threads to enable the first thread to determine whether first thread has obtained the lock on the shared resource, the first thread obtaining the lock on the share resource when the contents of the other memory variable has a first value, and the first thread not obtaining the lock on the share resource when the contents of the other memory variable has a second value that is different than the first value.

3. The method of claim 1 wherein the second thread is configured to access the shared resource more frequently than the first thread, and wherein the method further comprises:
    running the second thread without a memory barrier operation to reduce system overhead incurring during execution of the second thread.

4. The method of claim 1 wherein the computerized system is a Windows-based operating system platform, and wherein executing the operating system code includes:
    carrying out a VirtualProtect() procedure within the Windows-based operating system platform.

5. The method of claim 1 wherein the computerized system is a UNIX-based operating system platform, and wherein executing the operating system code includes:
    carrying out an mprotect() procedure within the UNIX-based operating system platform.

6. A computerized system, comprising:
    an interface configured to provide external access to the computerized system;
    a shared resource; and
    control circuitry coupled to the interface and the share resource, the control circuitry, when accessing the shared resource, being configured to:
    run a first portion of a first thread within the computerized system, the first portion (i) requesting a lock on the shared resource and (ii) directing the computerized system to make operations of a second thread visible in a correct order, the correct order preventing an exclusion failure, the first portion of the thread representing at least instructions that perform the steps of requesting and directing;
    make operations of the second thread visible in the correct order in response to the first portion of the first thread running within the computerized system, the second thread visible to at least one other processor; and
    run a second portion of the first thread within the computerized system to determine whether the first thread has obtained the lock on the shared resource, the second portion of the thread representing at least one instruction that performs the step of determining whether the first thread has obtained the lock on the shared resource;
    wherein the control circuitry, when running the first portion of the first thread, is configured to:
    perform a store operation which stores a lock request value in a memory variable which is accessible by both the first and second threads;
    perform a memory baffler operation which guarantees execution of the store operation before a next operation; and
    perform, as the next operation, the system call which directs the computerized system to make operations of the second thread visible in the correct order;
    wherein the control circuitry, when performing the system call, is configured to:
    execute operating system code to change protection of a page of memory of the computerized system.

7. The computerized system of claim 6 wherein the control circuitry, when running the second portion of the first thread, is configured to:
    perform a load operation which loads contents of another memory variable which is accessible by both the first and second threads to enable the first thread to determine whether first thread has obtained the lock on the shared resource, the first thread obtaining the lock on the share resource when the contents of the other memory variable has a first value, and the first thread not obtaining the lock on the share resource when the contents of the other memory variable has a second value that is different than the first value.

8. The computerized system of claim 6 wherein the second thread is configured to access the shared resource more frequently than the first thread; and wherein the control circuitry is further configured to:
   run the second thread without a memory baffler operation to reduce system overhead incurred during execution of the second thread.

9. The computerized system of claim 6 wherein the computerized system is a Windows-based operating system platform; and wherein the control circuitry, when executing the operating system code, is configured to:
   carry out a VirtualProtect() procedure within the Windows-based operating system platform.

10. The computerized system of claim 6 wherein the computerized system is a UNIX-based operating system platform; and wherein the control circuitry, when executing the operating system code, is configured to:
    carry out an mprotect() procedure within the UNIX-based operating system platform.

11. A computer program product that includes a computer readable medium having instructions stored thereon for accessing a shared resource of a computerized system, such that the instructions, when carried out by the computerized system, causes the computerized system to:
    run a first portion of a first thread within the computerized system, the first portion (i) requesting a lock on the shared resource and (ii) directing the computerized system to make operations of a second thread visible in a correct order, the correct order preventing an exclusion failure, the first portion of the thread representing at least instructions that perform the steps of requesting and directing;
    make operations of the second thread visible in the correct order in response to the first portion of the first thread running within the computerized system, the second thread visible to at least one other processor; and
    run a second portion of the first thread within the computerized system to determine whether the first thread has obtained the lock on the shared resource, the second portion of the thread representing at least one instruction that performs the step of determining whether the first thread has obtained the lock on the shared resource;
    wherein running the first portion of the first thread includes:
    performing a store operation which stores a lock request value in a memory variable which is accessible by both the first and second threads; performing a memory barrier operation which guarantees execution of the store operation before a next operation; and
    performing, as the next operation, the system call which directs the computerized system to make operations of the second thread visible in the correct order;
    wherein performing the system call includes:
    executing operating system code to change protection of a page of memory of the computerized system.

12. The computer program product of claim 11 wherein running the second portion of the first thread includes:
    performing a load operation which loads contents of another memory variable which is accessible by both the first and second threads to enable the first thread to determine whether first thread has obtained the lock on the shared resource, the first thread obtaining the lock on the share resource when the contents of the other memory variable has a first value, and the first thread not obtaining the lock on the share resource when the contents of the other memory variable has a second value that is different than the first value.

13. The computer program product of claim 11 wherein the second thread is configured to access the shared resource more frequently than the first thread, and wherein the computer program product when carrying out the instructions:
    runs the second thread without a memory baffler operation to reduce system overhead incurred during execution of the second thread.

14. The computer program product of claim 11 wherein the computerized system is a Windows-based operating system platform, and wherein executing the operating system code includes: carrying out a VirtualProtect() procedure within the Windows-based operating system platform.

15. The computer program product of claim 11 wherein the computerized system is a UNIX-based operating system platform, and wherein executing the operating system code includes:
    carrying out an mprotect() procedure within the UNIX-based operating system platform.

\* \* \* \* \*

UNITED STATES PATENT AND TRADEMARK OFFICE
CERTIFICATE OF CORRECTION

PATENT NO. : 7,644,409 B2 Page 1 of 1
APPLICATION NO. : 10/861795
DATED : January 5, 2010
INVENTOR(S) : David Dice, Hui Huang and Mingyao Yang It is certified that error appears in the above-identified patent and that said Letters Patent is hereby corrected as shown below:

Column 30, line 32, claim 13 - delete "baffler" and insert --barrier--.

Signed and Sealed this

Sixteenth Day of March, 2010

David J. Kappos
*Director of the United States Patent and Trademark Office*

UNITED STATES PATENT AND TRADEMARK OFFICE
CERTIFICATE OF CORRECTION

| | | |
|---|---|---|
| PATENT NO. | : 7,644,409 B2 | Page 1 of 1 |
| APPLICATION NO. | : 10/861795 | |
| DATED | : January 5, 2010 | |
| INVENTOR(S) | : Dice et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1615 days.

Signed and Sealed this

Twenty-first Day of December, 2010

David J. Kappos
*Director of the United States Patent and Trademark Office*